(12) United States Patent
Richmond et al.

(10) Patent No.: US 9,483,706 B2
(45) Date of Patent: Nov. 1, 2016

(54) HARDWARE ACCELERATOR FOR HISTOGRAM OF GRADIENTS

(71) Applicant: Linear Algebra Technologies Limited, Dublin (IE)

(72) Inventors: Richard Richmond, Belfast (GB); Cormac Brick, Dublin (IE); Brendan Barry, Dublin (IE); David Moloney, Dublin (IE)

(73) Assignee: Linear Algebra Technologies Limited (IE)

( * ) Notice: Subject to any disclaimer, the term of this patent is extended or adjusted under 35 U.S.C. 154(b) by 111 days.

(21) Appl. No.: 14/592,264

(22) Filed: Jan. 8, 2015

(65) Prior Publication Data

US 2016/0203384 A1    Jul. 14, 2016

(51) Int. Cl.

| | |
|---|---|
| *G06K 9/00* | (2006.01) |
| *G06K 9/46* | (2006.01) |
| *G06K 9/52* | (2006.01) |
| *G06F 9/30* | (2006.01) |

(52) U.S. Cl.
CPC ......... *G06K 9/4642* (2013.01); *G06F 9/30036* (2013.01); *G06K 9/46* (2013.01); *G06K 9/52* (2013.01); *G06K 2009/4666* (2013.01)

(58) Field of Classification Search
CPC ........ G06K 9/4642; G06K 9/46; G06K 9/52; G06K 9/4672; G06K 9/00751; G06F 9/30036; G06F 17/30256; G01N 2021/887; G06T 7/2033; G06T 2207/20068

USPC ......................................................... 382/170
See application file for complete search history.

(56) References Cited

U.S. PATENT DOCUMENTS

| | | | | |
|---|---|---|---|---|
| 2010/0232643 | A1* | 9/2010 | Chen .................... | G06K 9/4671 382/103 |
| 2011/0286627 | A1* | 11/2011 | Takacs ................. | G06K 9/4642 382/103 |
| 2014/0152762 | A1* | 6/2014 | Ukil ...................... | G06T 3/4038 348/36 |

\* cited by examiner

*Primary Examiner* — Yon Couso
(74) *Attorney, Agent, or Firm* — Wilmer Cutler Pickering Hale and Dorr LLP

(57) ABSTRACT

One of the challenges in bringing computational imaging to a mass market is that computational imaging is inherently computationally expensive. The computational challenges associated with computational imaging are apparent with the computation of a histogram of gradient descriptors. Oftentimes, generating a histogram of gradient descriptors involves computing gradients of an image, binning the gradients according to their orientation, and, optionally, normalizing the bins using a non-linear function. Because each of these operations is expensive, the histogram of gradient descriptor computations is generally computationally expensive and is difficult to implement in a power efficient manner for mobile applications. The present application discloses a computing device that can provide a low-power, highly capable computing platform for computing a histogram of gradient descriptors.

20 Claims, 17 Drawing Sheets

| Method | ADD | MUL | DIV | sqrt | arctan |
|--------|------|------|------|------|--------|
| HOG | 11664 | 1296 | 5200 | 16 | 5184 |

FIG. 1

| Position | θ ≥ | θ < | tan(θ) ≥ | tan(θ) < |
|---|---|---|---|---|
| 0 | 0 | 2.5 | 0 | 0.043661 |
| 1 | 2.5 | 5 | 0.043661 | 0.087489 |
| 2 | 5 | 7.5 | 0.087489 | 0.131652 |
| 3 | 7.5 | 10 | 0.131652 | 0.176327 |
| 4 | 10 | 12.5 | 0.176327 | 0.221695 |
| 5 | 12.5 | 15 | 0.221695 | 0.267949 |
| 6 | 15 | 17.5 | 0.267949 | 0.315299 |
| 7 | 17.5 | 20 | 0.315299 | 0.36397 |
| 8 | 20 | 22.5 | 0.36397 | 0.414214 |
| 9 | 22.5 | 25 | 0.414214 | 0.466308 |
| 10 | 25 | 27.5 | 0.466308 | 0.520567 |
| 11 | 27.5 | 30 | 0.520567 | 0.57735 |
| 12 | 30 | 32.5 | 0.57735 | 0.63707 |
| 13 | 32.5 | 35 | 0.63707 | 0.700208 |
| 14 | 35 | 37.5 | 0.700208 | 0.767327 |
| 15 | 37.5 | 40 | 0.767327 | 0.8391 |
| 16 | 40 | 42.5 | 0.8391 | 0.916331 |
| 17 | 42.5 | 45 | 0.916331 | 1 |

FIG. 11

| position | $a$ | $a^2$ | $1+a^2$ | $\sqrt{(1+a^2)}$ |
|---|---|---|---|---|
| 1 | 0 | 0 | 1 | 1 |
| 2 | 0.0625 | 0.00390625 | 1.00390625 | 1.001951221 |
| 3 | 0.125 | 0.015625 | 1.015625 | 1.007782219 |
| 4 | 0.1875 | 0.03515625 | 1.03515625 | 1.017426287 |
| 5 | 0.25 | 0.0625 | 1.0625 | 1.030776406 |
| 6 | 0.3125 | 0.09765625 | 1.09765625 | 1.047690913 |
| 7 | 0.375 | 0.140625 | 1.140625 | 1.068000468 |
| 8 | 0.4375 | 0.19140625 | 1.19140625 | 1.091515575 |
| 9 | 0.5 | 0.25 | 1.25 | 1.118033989 |
| 10 | 0.5625 | 0.31640625 | 1.31640625 | 1.147347484 |
| 11 | 0.625 | 0.390625 | 1.390625 | 1.179247642 |
| 12 | 0.6875 | 0.47265625 | 1.47265625 | 1.21353049 |
| 13 | 0.75 | 0.5625 | 1.5625 | 1.25 |
| 14 | 0.8125 | 0.66015625 | 1.66015625 | 1.288470508 |
| 15 | 0.875 | 0.765625 | 1.765625 | 1.328768227 |
| 16 | 0.9375 | 0.87890625 | 1.87890625 | 1.370732012 |
| 17 | 1 | 1 | 2 | 1.414213562 |

FIG. 15

HARDWARE ACCELERATOR FOR HISTOGRAM OF GRADIENTS

CROSS-REFERENCE TO RELATED APPLICATIONS

This application is related to U.S. patent application Ser. No. 14/458,014, entitled "LOW POWER COMPUTATIONAL IMAGING," filed on Aug. 12, 2014; and to U.S. patent application Ser. No. 14/457,929, entitled "VECTOR PROCESSOR," filed on Aug. 12, 2014, each of which is hereby incorporated by reference herein in its entirety.

FIELD OF THE APPLICATION

The present application relates generally to image processing. In particular, the present application relates to providing hardware support to image processing applications.

BACKGROUND

A histogram of oriented gradients (HoG) is a feature descriptor used in a variety of computer vision and image processing applications, such as object detection and object recognition applications. HoG descriptors have been particularly useful in detecting and recognizing, among other things, humans, animals, faces, and text. For example, an object detection system or an object recognition system can be configured to generate HoG descriptors that describe features of objects in an input image. The system can also be configured to compare the generated HoG descriptors against a database of HoG descriptors, corresponding to known objects, to determine whether any of the known objects is present in the input image. HoG descriptors are believed to be effective because they generally exhibit tolerance to rotations, scaling, and lighting variations in objects captured by images.

Unfortunately, generating a HoG descriptor from an image can be computationally expensive. A HoG descriptor is generally computed for a patch of an image, also referred to as a region of interest (ROI.) FIG. 1 shows a number of addition (ADD) operations, multiplication (MUL) operations, division (DIV) operations, square-root (sqrt) operations, and arc-tangent (arctan) operations performed to determine a HoG descriptor for an ROI having 42-by-42 pixels. The table in FIG. 1 illustrates that the HoG descriptor computation includes computing numerous costly mathematical functions, such as square-roots, divisions and arc-tangents, which may take many clock cycles to implement on a conventional sequential processor. Furthermore, the table also illustrates that the HoG descriptor computation also includes performing a large number of common operations, such as additions and multiplications. Therefore, the HoG descriptor computation is generally computationally expensive.

The high computational cost for computing a HoG descriptor can be a significant bottleneck in a variety of computer vision and image processing applications because these applications generally compute HoG descriptors for various positions in an image and for a variety of ROI sizes to account for scaling effects. Therefore, the use of HoG descriptors has been generally limited to high performance computing systems.

SUMMARY

The disclosed embodiments include an apparatus implemented in a semiconductor integrated chip. The apparatus can include a memory device and a hardware accelerator. The hardware accelerator can include a programmable convolution module that is configured to compute a gradient vector for at least one pixel in an input image, wherein the gradient vector comprises a first gradient component along a first axis and a second gradient component along a second axis, and a histogram of gradient (HoG) estimator module configured to receive the gradient vector and identify one of a plurality of orientation bins in a HoG descriptor associated with the gradient vector using an orientation table stored in the memory device. The apparatus can also include a HoG binning module configured to add a contribution of the gradient vector to the one of the plurality of orientation bins based on a magnitude of the gradient vector, thereby generating the HoG descriptor.

In some embodiments, the orientation table includes an entry that relates the one of the plurality of orientation bins and a ratio of the first gradient component and the second gradient component.

In some embodiments, the HoG estimator module is configured to receive all gradient vectors in a region of interest in the input image, and provide an orientation bin associated with each of the gradient vectors in the region of interest to the HoG binning module.

In some embodiments, the HoG binning module is configured to generate a HoG descriptor for the region of interest by processing two or more gradient vectors in parallel in accordance with the orientation bin associated with the two or more gradient vectors.

In some embodiments, the HoG binning module is configured to concatenate HoG descriptors associated with two or more regions of interest to generate a block HoG descriptor.

In some embodiments, the HoG binning module is configured to normalize the block HoG descriptor using a normalization constant computed based on a normalization table stored in the memory device.

In some embodiments, the normalization table comprises an entry that indicates a precomputed result of a normalization function for a particular input value.

In some embodiments, the HoG binning module is configured to interpolate two or more precomputed results of the normalization function; and compute the normalization constant for the block HoG descriptor based on the interpolation.

In some embodiments, the HoG binning module comprises a software module for operating in a vector processor.

In some embodiments, the vector processor further comprises a recognition module configured to use the block HoG descriptor to perform object recognition.

The disclosed embodiments include a method. The method can include computing, using a programmable convolution module of a hardware accelerator in an electronic device, a gradient vector for at least one pixel in an input image, wherein the gradient vector comprises a first gradient component along a first axis and a second gradient component along a second axis; identifying, using a histogram of gradient (HoG) estimator module in the hardware accelerator, one of a plurality of orientation bins in a HoG descriptor for the gradient vector using an orientation table stored in a memory device of the electronic device; and adding, using a HoG binning module in communication with the HoG estimator module in the electronic device, a contribution of the gradient vector to the one of the plurality of orientation bins based on a magnitude of the gradient vector, thereby generating a HoG descriptor.

In some embodiments, the orientation table includes an entry that relates the one of the plurality of orientation bins and a ratio of the first gradient component and the second gradient component.

In some embodiments, the method can include receiving, at the HoG estimator module, all gradient vectors in a region of interest in the input image, and providing, by the HoG estimator module, an orientation bin associated with each of the gradient vectors in the region of interest to the HoG binning module.

In some embodiments, the method can include generating, at the HoG binning module, a HoG descriptor for the region of interest by processing two or more gradient vectors in parallel.

In some embodiments, the method can include concatenating, at the HoG binning module, HoG descriptors associated with two or more regions of interest to generate a block HoG descriptor.

In some embodiments, the method can include normalizing, at the HoG binning module, the block HoG descriptor using a normalization constant computed based on a normalization table stored in the memory device.

In some embodiments, the normalization table comprises an entry that indicates a precomputed result of a normalization function for a particular input value.

In some embodiments, the method can include interpolating two or more precomputed results of the normalization function; and computing the normalization constant for the block HoG descriptor based on the interpolation.

In some embodiments, the HoG binning module resides in a vector processor in communication with the hardware accelerator via the memory device.

In some embodiments, the electronic device comprises a mobile device.

DESCRIPTION OF DRAWINGS

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labeled in every figure. Nor is every component of each embodiment of the disclosed subject matter shown where illustration is not necessary to allow those of ordinary skill in the art to understand the disclosed subject matter.

FIG. 1 shows a number of addition (ADD) operations, multiplication (MUL) operations, division (DIV) operations, square-root (sqrt) operations, and arc-tangent (arctan) operations performed to determine a histogram of gradient (HoG) descriptor for an ROI having 42-by-42 pixels.

FIG. 11 illustrates an angle index table in accordance with some embodiments.

FIG. 15 shows a normalization table in accordance with some embodiments.

DETAILED DESCRIPTION

Figure 2:
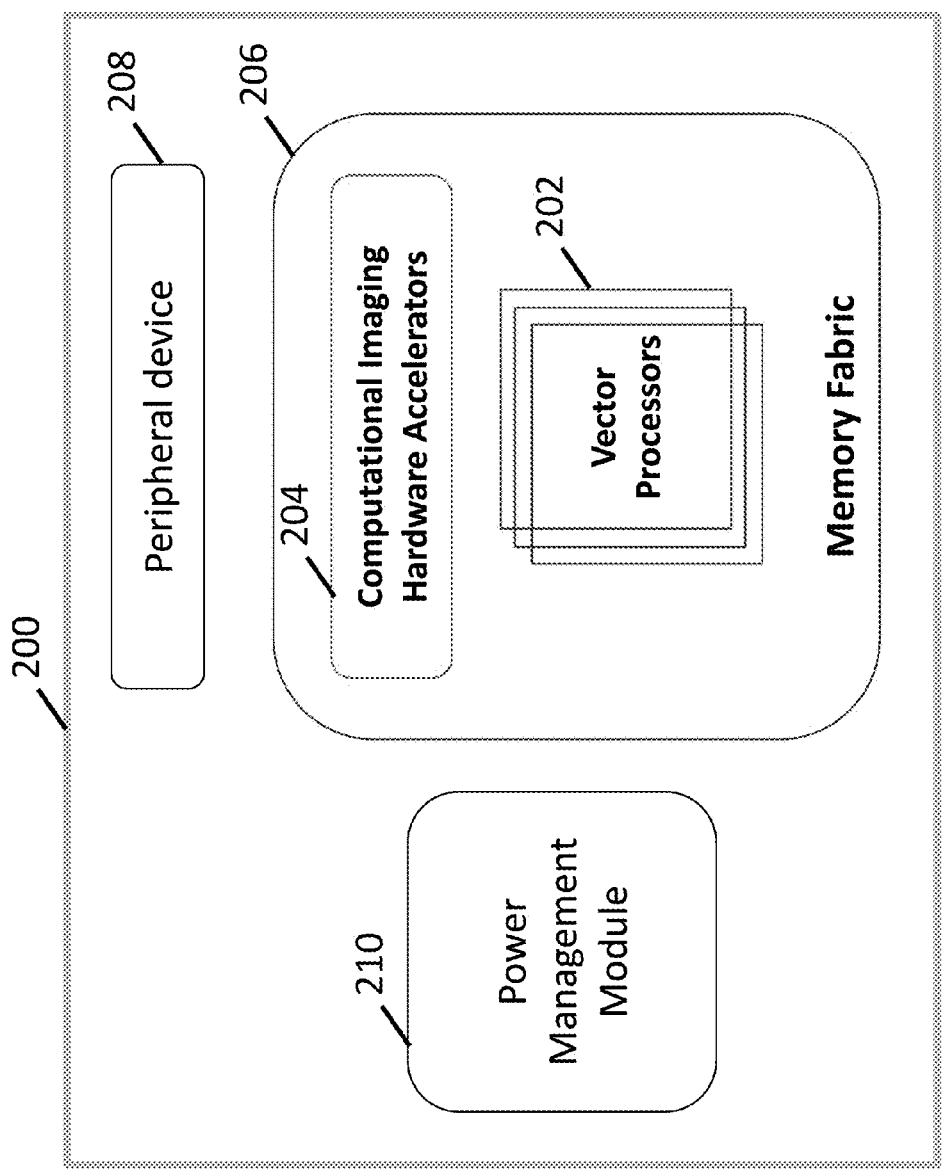
FIG. 2 provides a high level illustration of the computing device in accordance with some embodiments.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Computational imaging can transform the ways in which machines capture and interact with the physical world. For example, via computational imaging, machines can capture images that were extremely difficult to capture using traditional imaging techniques. As another example, via computational imaging, machines can detect and recognize their surroundings and react in accordance with their surroundings.

One of the challenges in bringing computational imaging to a mass market is that computational imaging is inherently computationally expensive. Computational imaging often uses a large number of images at a high resolution and/or a large number of videos with a high frame rate. Therefore, computational imaging often needs the support of powerful computing platforms. Furthermore, because computational imaging is often used in mobile settings, for example, using a smartphone or a tablet computer, computational imaging often needs the support of powerful computing platforms that can operate at a low power budget.

The computational challenges associated with computational imaging is apparent with the computation of histogram of gradient (HoG) descriptors. A HoG can include an array of orientation bins. An orientation bin can correspond to a range of orientation values of a sampled data set. An orientation bin in a HoG descriptor can count the frequency of occurrences of gradient vectors within a local region, pointing to a particular range of orientation values. In other words, the HoG can represent a frequency distribution of gradient vectors within a local region pointing to particular orientations.

HoG descriptors are often used in object detection and object recognition applications because HoG descriptors exhibit high accuracy and effectiveness in locating and describing region of interests within one or more images. HoG descriptors can be similar to edge orientation histograms, scale-invariant feature transform descriptors, and shape contexts, but can differ from these examples in that the HoG descriptors can provide a dense grid of uniformly spaced cells and use overlapping local contrast normalization for improved accuracy.

As such, a HoG descriptor is generally determined based on gradient values within a block in an image. The block may include a plurality of pixels, each of which may be associated with a gradient vector. The gradient vector can be represented as a magnitude and an orientation. The HoG descriptor can be thought of as a histogram of gradient vector magnitudes that are binned (or discretized) in accordance with their orientations.

Therefore, generating HoG descriptors often involves computing gradients of an image, binning the gradients according to their orientation, and, optionally, normalizing the bins using a non-linear function. Because each of these operations is expensive, the HoG descriptor computations are generally computationally expensive and are difficult to implement in a power efficient manner for mobile applications.

The present application discloses a computing device that can provide a low-power, highly capable computing platform for computing HoG descriptors. FIG. 2 provides a high level illustration of the computing device in accordance with some embodiments. The computing device 200 can include one or more processing units, for example one or more vector processors 202 and one or more hardware accelerators 204, an intelligent memory fabric 206, a peripheral device 208, and a power management module 210.

The one or more vector processors 202 includes a central processing unit (CPU) that implements an instruction set containing instructions that operate on an array of data called vectors. More particularly, the one or more vector processors 202 can be configured to perform generic arithmetic operations on a large volume of data simultaneously. In some embodiments, the one or more vector processors 202 can include a single instruction multiple data, very long instruction word (SIMD-VLIW) processor. In some embodiments, the one or more vector processors 202 can be designed to execute instructions associated with computer vision and imaging applications.

In some embodiments, the one or more vector processors 202 can be designed to execute a proprietary instruction set. The proprietary instruction set can include a proprietary instruction. The proprietary instruction can be a variable length binary string that includes an instruction header and one or more unit instructions. The instruction header can include information on the instruction length and the active units for the associated proprietary instruction; the unit instruction can be a variable length binary string that includes a number of fields that is either fixed or variable. The fields in the unit instruction can include an opcode that identifies the instruction and one or more operands that specifies the value(s) to use in the unit instruction execution.

Details of the vector processors 202 are provided in U.S. patent application Ser. No. 14/457,929, entitled "VECTOR PROCESSOR," filed on Aug. 12, 2014, which is herein incorporated by reference in its entirety.

The one or more hardware accelerators 204 includes computer hardware that performs some functions faster than is possible in software running on a more general-purpose CPU. Examples of a hardware accelerator in non-vision applications include a blitting acceleration module in graphics processing units (GPUs) that is configured to combine several bitmaps into one using a raster operator.

In some embodiments, the one or more hardware accelerators 204 can provide a configurable infrastructure that is tailored to image processing and computer vision applications. The hardware accelerators 204 can be considered to include generic wrapper hardware for accelerating image processing and computer vision operations surrounding an application-specific computational core. For example, a hardware accelerator 204 can include a dedicated filtering module for performing image filtering operations. The filtering module can be configured to operate a customized filter kernel across an image in an efficient manner. In some embodiments, the hardware accelerator 204 can output one fully computed output pixel per clock cycle.

The intelligent memory fabric 206 can be configured to provide a low power memory system with small latency. Because images and videos include a large amount of data, providing a high-speed interface between memory and processing units is important. In some embodiments, the intelligent memory fabric 206 can include, for example, 64 blocks of memory, each of which can include a 64-bit interface. In such embodiments, the memory fabric 206 operating at 600 MHz, for example, is capable of transferring data at 307.2 GB/sec. In other embodiments, the intelligent memory fabric 206 can include any other number of blocks of memory, each of which can include any number of interfaces implementing one or more interface protocols.

The memory fabric 206 can include a central memory system that coordinates memory operations within the computing device 200. The memory fabric 206 can be designed to reduce unnecessary data transfer between processing units, such as vector processors 202 and hardware accelerators 204. The memory fabric 206 is constructed to allow a plurality of processing units to access, serially or in parallel or a combination thereof, data and program code memory without stalling. Additionally, the memory fabric 206 can make provision for a host processor to access the memory system in the memory fabric 206 via a bus such as the Advanced eXtensible Interface (AXI) or any other suitable bus 208. In some embodiments, the bus can be configured to provide serial or parallel communication.

A memory system in the memory fabric 206 can include a plurality of memory slices, each memory slice being associated with one of the vector processors 202 and giving preferential access to that processor over other vector processors 202. Each memory slice can include a plurality of Random Access Memory (RAM) tiles, where each RAM tile can include a read port and a write port. In some cases, each memory slice may be provided with a memory slice controller for providing access to a related memory slice.

The processors and the RAM tiles can be coupled to one another via a bus. In some cases, the bus can couple any of the vector processors 202 with any of the memory slices in the memory fabric 206. Suitably, each RAM tile can include a tile control logic block for granting access to the tile. The tile control logic block is sometimes referred to as tile control logic or an arbitration block.

In some embodiments, each memory slice can include a plurality of RAM tiles or physical RAM blocks. For instance, a memory slice having the size of 128 kB can include four 32 kB single-ported RAM tiles (e.g., physical RAM elements) organized as 4k×32-bit words. As another instance, a memory slice having a size of 256 kB can include eight 32 kB single-ported RAM tiles (e.g., physical RAM elements) organized as 8k×32-bit words. In some embodiments, the memory slice can have a capacity as low as 16 kB and as high as 16 MB. In other embodiments, the memory slice can be configured to have as much capacity as needed to accommodate a variety of applications handled by the computing device.

In some embodiments, a RAM tile can include a single-ported complementary metal-oxide-semiconductor (CMOS) RAM. The advantage of a single ported CMOS RAM is that it is generally available in most semiconductor processes. In other embodiments, a RAM tile can include a multi-ported CMOS RAM. In some embodiments, each RAM tile can be 16-bit wide, 32-bit wide, 64-bit wide, 128-bit wide, or can be as wide as needed by the particular application of the computing device.

The use of single-ported memory devices can increase the power and area efficiency of the memory subsystem, but can limit the bandwidth of the memory system. In some embodiments, the memory fabric 206 can be designed to allow these memory devices to behave as a virtual multi-ported memory subsystem capable of servicing multiple simultaneous read and write requests from multiple sources (processors and hardware blocks). This can be achieved by using multiple physical RAM instances and providing arbitrated access to them to service multiple sources.

In some embodiments, each RAM tile can be associated with tile control logic. The tile control logic is configured to receive requests from vector processors 202 or hardware accelerators 204 and provide access to individual read and write-ports of the associated RAM tile. For example, when a vector processor 202 is ready to access data in a RAM tile, before the vector processor 202 sends the memory data request to the RAM tile directly, the vector processor 202 can send a memory access request to the tile control logic associated with the RAM tile. The memory access request can include a memory address of data requested by the processing element. Subsequently, the tile control logic can analyze the memory access request and determine whether the vector processor 202 can access the requested RAM tile. If the vector processor 202 can access the requested RAM tile, the tile control logic can send an access grant message to the vector processor 202, and subsequently, the vector processor 202 can send a memory data request to the RAM tile.

In some embodiments, the tile control logic can be configured to determine and enforce an order in which many processing units (e.g., vector processors and hardware accelerators) access the same RAM tile. For example, the tile control logic can include a clash detector, which is configured to detect an instance at which two or more processing units attempt to access a RAM tile simultaneously. The clash detector can be configured to report to a runtime scheduler that an access clash has occurred and that the access clash should be resolved.

The memory fabric 206 can also include a memory bus for transferring data bits from memory to vector processors 202 or hardware accelerators 204, or from vector processors 202 or hardware accelerators 204 to memory. The memory fabric 206 can also include a direct memory access (DMA) controller that coordinates the data transfer amongst vector processors 202, hardware accelerators 204, and memory.

The peripheral device 208 can be configured to provide a communication channel for sending and receiving data bits to and from external devices, such as an image sensor and an accelerometer. The peripheral device 208 can provide a communication mechanism for the vector processors 202, the hardware accelerators 204, and the memory fabric 206 to communicate with the external devices.

The power management module 210 can be configured to control activities of designated blocks within the computing device 200. More particularly, the power management module 210 can be configured to control the power supply voltage of designated blocks, also referred to as power islands, within the computing device 200. For example, when the power management module 210 enables a power supply of a power island, the computing device 200 can be triggered to provide an appropriate power supply voltage to the power island. In some embodiments, each power island can include an independent power domain. Therefore, the power supply of power islands can be controlled independently. In some embodiments, the power management module 210 can also be configured to control activities of power islands externally attached to the computing device 200 via one or more of input/output pins in the computing device 200.

In some embodiments, the one or more processing units, for example one or more vector processors 202 and one or more hardware accelerators 204, the intelligent memory fabric 206, the peripheral device 208, and the power management module 210 can be configured to communicate via an interface. The interface can provide an input and/or output mechanism to communicate with other devices. The interface can be implemented in hardware to send and receive signals in a variety of mediums, such as optical, copper, and wireless, and in a number of different protocols, some of which may be non-transitory.

Figure 3:
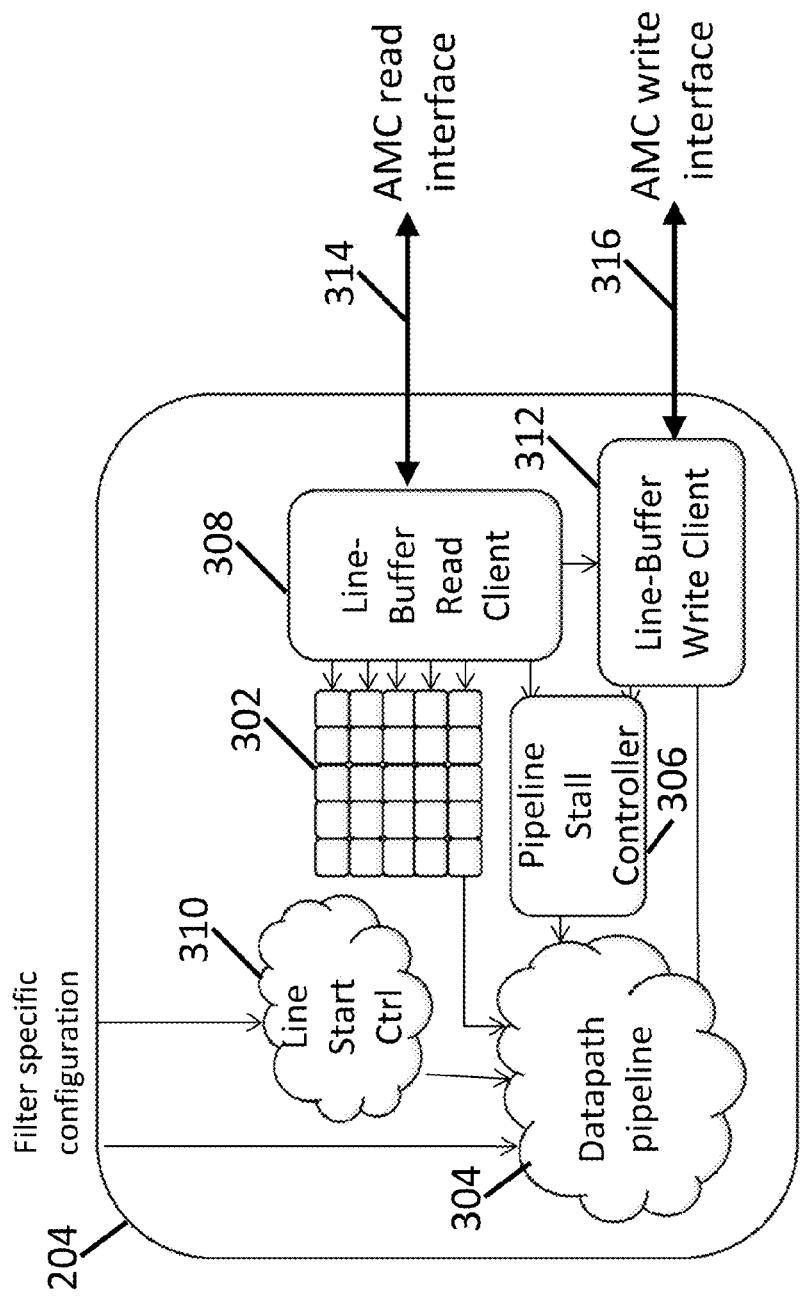
FIG. 3 illustrates a hardware accelerator in accordance with some embodiments.

FIG. 3 illustrates a hardware accelerator in accordance with some embodiments. The hardware accelerator 204 can include a collection of hardware image processing filters.

The hardware accelerator 204 can enable some of the computationally intensive functionalities to be offloaded from the vector processors 202.

In some embodiments, a filter module can be designed primarily to process buffers in the memory fabric 206. The configuration of filter modules, including their buffer base addresses, can be achieved via one or more APB slave interfaces.

In some embodiments, the hardware accelerator 204 can receive image data via a MIPI receiver filter module and a MIPI transmitter filter module. The MIPI receiver filter module and the MIPI transmitter filter module can allow other filter modules in the hardware accelerator 204 to establish a direct connection to a MIPI receiver controller and a MIPI transceiver controller. The MIPI receiver filter module and the MIPI transmitter filter module can connect to the MIPI controllers via parallel interfaces and can be used to stream data into/out of the memory fabric 206 directly from/to the MIPI controller.

In some embodiments, a filter module in a hardware accelerator 104 can operate a 2-dimensional kernel on pixels centered at the current pixel. All the pixels in the kernel can contribute in processing pixels centered at the current pixel.

In some embodiments, a filter module in a hardware accelerator 104 can process an image line-by-line. For example, a filter module can scan an image from the top to bottom to generate a scan-line of an image, and process the scan-lines, for instance, moving from left to right. In other examples, a filter module can generate scan-lines of an image by scanning an image in any orientation and/or ordering suitable for the filter processing.

In some embodiments, a filter module can process a scan-line of an image by reading data to form a kernel for a first pixel on the scan-line. The filter module can process the scan-line by sliding the kernel in a sliding-window manner. Once the processing is complete, the filter module can write the output pixels into an output buffer or a memory location.

In some embodiments, kernels for filtering are typically square and often have an odd number of pixels along each side, e.g., 3×3, 5×5, or 7×7. If a filter module uses a K×K pixel kernel, then K scan-lines of image data can be read from an input buffer for each line of image data processed and written to its output buffer.

In some embodiments, the hardware accelerator 204 can use a circular input buffer. Suppose that a target filter module is configured to receive, as input, an output scan-line of another filter module (also referred to as a parent filter module). Suppose also that the target filter module uses a K×K pixel kernel. Then the input buffer for the target filter module can be designed to maintain at least (K+1) scan-lines of image data: K scan-lines for the filter module and one (or more) scan-line(s) for simultaneously receiving an output scan-line of the parent filter module. In this example, because the input buffer is circular, after receiving (K+1) scan-lines from the parent filter module, the (K+2)th scan-line can be written over the location of the first line. In most cases, the parent filter module can be ahead of the target filter module in terms of its current line number within the input image.

In some embodiments, buffers in the hardware accelerator 104 can be aligned by a predetermined number of bytes. For example, buffers in the hardware accelerator 104 can be aligned on 8-byte boundaries. When an image width is not a multiple of a predetermined number of bytes, then the hardware accelerator 104 can be configured to write null bytes to output buffers between the (unaligned) end of each scan-line and the next byte boundary.

FIG. 3 illustrates an implementation of a hardware accelerator for operating a filter kernel, stored in a filter kernel register 302, on an input data stream (e.g., scan-lines of one or more images). The input data streams can correspond to pixels in one or more images. The hardware accelerator 204 can include a datapath pipeline 304, a pipeline stall controller 306, a line buffer read client 308, a line start control input 310, and a line buffer write client 310.

In some embodiments, the filter kernel register 302 can be programmed to modify the kernel to be operated on the input data stream. The filter kernel register 302 can be configured to accommodate a variety of kernel sizes. For example, the filter kernel register 302 can be configured to accommodate a 3×3 kernel, a 5×5 kernel, a 7×7 kernel, a 9×9 kernel, or any other kernel sizes represented as m×n. In some cases, m can be the same as n; in other cases, m can be different from n. In some embodiments, the filter kernel register 302 can be configured to accommodate kernels of various dimensions. For example, the filter kernel register 302 can be configured to accommodate a one-dimensional filter, a two-dimensional filter, a three-dimensional filter, or any integer-dimensional filters.

In some embodiments, the line start controller 310 can control a time instance at which the datapath pipeline 304 starts processing the received scan-line of an image. The line start controller 310 can also be configured to selectively enable one or more portions of the datapath pipeline 304 to perform customized operations. In some cases, the line start controller 310 can also control coefficients to be used during the filtering operation by the datapath pipeline 304.

In some embodiments, the datapath pipeline 304 and the line start controller 310 can be programmable. The datapath pipeline 304 and the line start controller 310 can be programmed so that different types of filtering operations can be performed by the hardware accelerator 204. For example, the datapath pipeline 304 and the line start controller 310 can be programmed with filter operation parameters, such as coefficient sets and/or thresholds, so that customized filtering operation can be carried out by the hardware accelerator 204. The filter operation parameters can also include a filter kernel size, coefficients, scaling ratios, gains, thresholds, look-up tables, or any other suitable parameters or combinations or parameters. Therefore, the hardware accelerator 204 can be considered as a generic wrapper for accommodating various image filtering operations.

In some embodiments, the datapath pipeline 304 can be configured to process numbers represented in one or more number formats. For example, the datapath pipeline 304 can be designed to operate on floating point numbers, e.g., fp16 (IEEE754-like 16-bit floating-point format), integer numbers, fixed-point numbers, or any other number formats suitable for image processing.

The hardware accelerator 204 can be configured to control how the datapath pipeline 304 consumes scan-lines from an input data buffer 308 and how the datapath pipeline 304 stores processed scan-lines to an output data buffer 312. The hardware accelerator 204 can be configured to implement one of two control modes: the buffer fill control (BFC) mode and the synchronous mode.

In some embodiments, under BFC mode, the hardware accelerator 204 can be configured to maintain internal counts of fill levels (e.g., the number of scan-lines stored in the input buffer). The hardware accelerator 204 can be configured to process a scan-line from its input buffer autonomously when (1) the hardware accelerator is enabled, (2) its input buffer has sufficient number of scan-lines, and (3) there is space in its output buffer to store a processed scan-line. In some cases, the buffer fill level needed to run the datapath pipeline 304 can depend on the height of a kernel. For example, when a kernel is 3×3, then the hardware accelerator 204 can require at least three scan-lines to operate a filter.

In some embodiments, under a synchronous control mode, a filter module in a hardware accelerator can be configured to run when a start bit for the filter module is turned on. The start bit can be turned on using, for example, a software module. Under synchronous control, the software module can be configured to determine that the input buffer for the filter module has a sufficient number of scan-lines and that the output buffer for the filter module has sufficient space to store processed scan-lines from the filter module. Once these conditions are satisfied, the software module can turn on the start bit of the filter module.

Under both modes, once a filter module processes a scan-line, the filter module can update its current line index within its buffer and within the input image. In some embodiments, when the output image does not have the same size as the input image, the filter module can update its current line index in the output image as well. The values of the line indices (and buffer fill levels for buffer fill control) can represent the internal state of a filter module. This internal state can be accessed by a software module and may be saved, updated, and restored such that the context of the filter module may be switched before the filter module is run in the next cycle.

In some embodiments, buffers in a hardware accelerator 204 can be configured to maintain a plurality of data planes. For example, buffers in a hardware accelerator 204 can be configured to maintain the red-channel, the green-channel, and the blue-channel of an image in separate planes. In some examples, the buffers in a hardware accelerator 204 can be configured to support up to sixteen planes. The scan-lines of an image data in each plane can be stored contiguously and planes can be defined by their number and by a plane stride.

In some embodiments, a filter module in a hardware accelerator 204 can be configured to process a scan-line from each data plane sequentially, one at a time. For sequential processing, from the control point of view, scan-lines from all planes may be considered to have the same time stamp. In other embodiments, a filter module in a hardware accelerator 204 can be configured to process multiple data planes in parallel.

In some embodiments, prior to processing an image/video stream, or if context is switched, a filter module can be appropriately configured and enabled. Each filter module can include a set of software programmable registers defining its input buffer(s) and output buffer configuration.

In some embodiments, a filter module may support a variety of data types. The most common data types supported by a filter module are listed below:
- U8—unsigned 8 bit integer data
- U8F—unsigned 8 bit fractional data the range [0, 1.0]
- U16—unsigned 16 bit integer data
- U32—unsigned 32 bit integer data
- FP16—half-precision (16 bit) floating point
- FP32—full-precision (32 bit) floating point In some embodiments, the datapath pipeline of a filter module can be optimized for its operation: half-precision floating point (FP16) arithmetic can used for operations involving a high dynamic range; optimized fixed-point arithmetic can be used where maintaining high precision is more important.

In some embodiments, a filter module implemented using a FP16 arithmetic may not be restricted to reading/writing only to FP16 buffers. U8F buffers may also be accessed with conversion to/from FP16 taking place automatically within the filter modules.

In some embodiments, where a filter module is implemented using FP16 arithmetic, the buffers may be either FP16 or U8F. When a buffer is FP16, the buffer configuration format can be set to 2. If a buffer is U8F, the buffer configuration format can be set to 1. For filter modules with FP16 datapath pipeline, if the input buffer format is "1," the read client can convert the U8 input data to FP16 automatically before processing. If the output buffer format is "1," the write client can convert FP16 from the datapath pipeline to U8F before storage.

In some embodiments, U8F is converted to normalized FP16, in the range [0, 1.0], by multiplying by 1.0/255. Normalized FP16 can be converted to U8F by multiplying by 255 and rounding, effectively quantizing the floating-point values into 8 bits. In some embodiments, the output data from filter modules with FP16 datapath pipeline may optionally be clamped into the normalized range [0, 1.0]. If conversion to U8F is enabled, then the clamp to the normalized range is implicitly enabled and is performed prior to the conversion to U8F described above. Filter modules implemented using FP16 datapath pipelines are not limited to processing data in the normalized range [0, 1.0]; the full range of FP16 can also be supported.

In some embodiments, a filter module is configured to track its vertical position in an input image. A filter module can use this information to perform vertical padding at the top and bottom of the image by line replication or reflection. A filter module that does not perform vertical padding may create an output image that is smaller than an input image, which may not be desirable in some cases.

In some embodiments, when a filter module is configured to perform vertical padding, the minimum number of scan-lines M that can be maintained by an input buffer can be:

$$M=(K>>1)+1, \text{ where } >> \text{ indicates a right bit-shift operator.}$$

At the top of the image, when the capacity of the input buffer (in terms of scan-lines) is less than M, there are not enough scan-lines in the buffer to perform the filtering operation. When the capacity of the input buffer (in terms of scan-lines) is greater than or equal to M, data may be processed if vertical padding is performed. Similarly, at the bottom of the image, when processing the last (K>>1) lines, the filter module can perform the replication of line N−1 (or reflection of line N−1 and the lines above it).

In some embodiments, vertical padding can be performed when the kernel has an even dimension. Vertical padding for a kernel with an even dimension can be virtually identical to vertical padding for a kernel with an odd dimension, except that one less line should be padded at the bottom.

In some embodiments, a filter module can perform a horizontal padding. The horizontal padding of a pixel kernel can be performed as data is read from the input buffer and written to the pixel kernel registers. The filter module can be aware of its position on the current line and at the start and end of a line. Therefore, valid pixel kernel registers can be replicated into those which do not hold valid data. As with vertical padding, whether horizontal padding is performed or not can depend on the specific functionality and requirements of a given filter module.

In some embodiments, in a circular buffer mode, a filter module can be configured to process one scan-line from its input buffer and write the processed scan-line to its output buffer. This set of operation can be referred to as a filter run.

In some embodiments, for flexibility, two different control mechanisms can be provided by which filter runs may be controlled. In the first mechanism, called buffer fill control mode, a filter module can track the fill levels of its circular buffers and determine, on its own, whether it can run. This approach is asynchronous in nature; the filter module can run, possibly repeatedly, as long as the required conditions are met. Control bits in registers are provided to allow software to inform the filter modules when a scan-line has been added to an input buffer or removed from an output buffer. When a scan-line is added to an input buffer, the fill level can be increased; when a scan-line is removed from an output buffer, the fill level can be decreased. In this mode, a filter module, together with its input and output buffers, may be viewed as a first-in-first-out (FIFO) with scan-lines occupying its entries and the depth of the FIFO configured by the number of scan-lines programmed for the input and output buffers.

In some embodiments, another filter module may add a scan-line to the FIFO if the filter module's input buffer is not full. Software can check the fill level of an input buffer before allowing another filter module to add a scan-line to the input buffer. Subsequently, the software or a filter module can increase a fill level associated with the input buffer. On the output side, the software can check the fill level of the output buffer, or respond to an interrupt event signifying that a filter module has added a new scan-line to its output buffer, before decrementing the output buffer's fill level (e.g. after a line in the filter's output buffer has been processed by another filter, like reading the FIFO).

The second mechanism, called a synchronous mode, depends on software to explicitly schedule each filter run. Start bits for each filter module can be provided in registers to which software may write to start a filter run immediately. When started by this mechanism, a filter module can be executed exactly once.

In some embodiments, a filter module can be interrupted when it receives an interrupt request. In some cases, a filter module can have a plurality of interrupt request sources which are mapped to external interrupt request lines and routed an interrupt controller. When a filter module flags an interrupt and that interrupt is enabled, then the corresponding external interrupt request line can be flagged.

In some embodiments, the plurality of interrupt request sources can include:

Input buffer fill level decrement interrupt
Output buffer fill level increment interrupt
Frame done interrupt The output buffer fill level increment interrupt may also be deemed to indicate that a filter module has finished its filter run when the filter module is configured to operate in synchronous mode.

Details of the computing device 200 are provided further in U.S. patent application Ser. No. 14/458,014, entitled "LOW POWER COMPUTATIONAL IMAGING," filed on Aug. 12, 2014, which is herein incorporated by reference in its entirety.

In some embodiments, the computing device 200 can include a HoG descriptor module for computing a HoG descriptor. The HoG descriptor module can use one or more of the hardware accelerators 204 and/or a vector processor 202 for computing the HoG descriptor.

Figure 4:
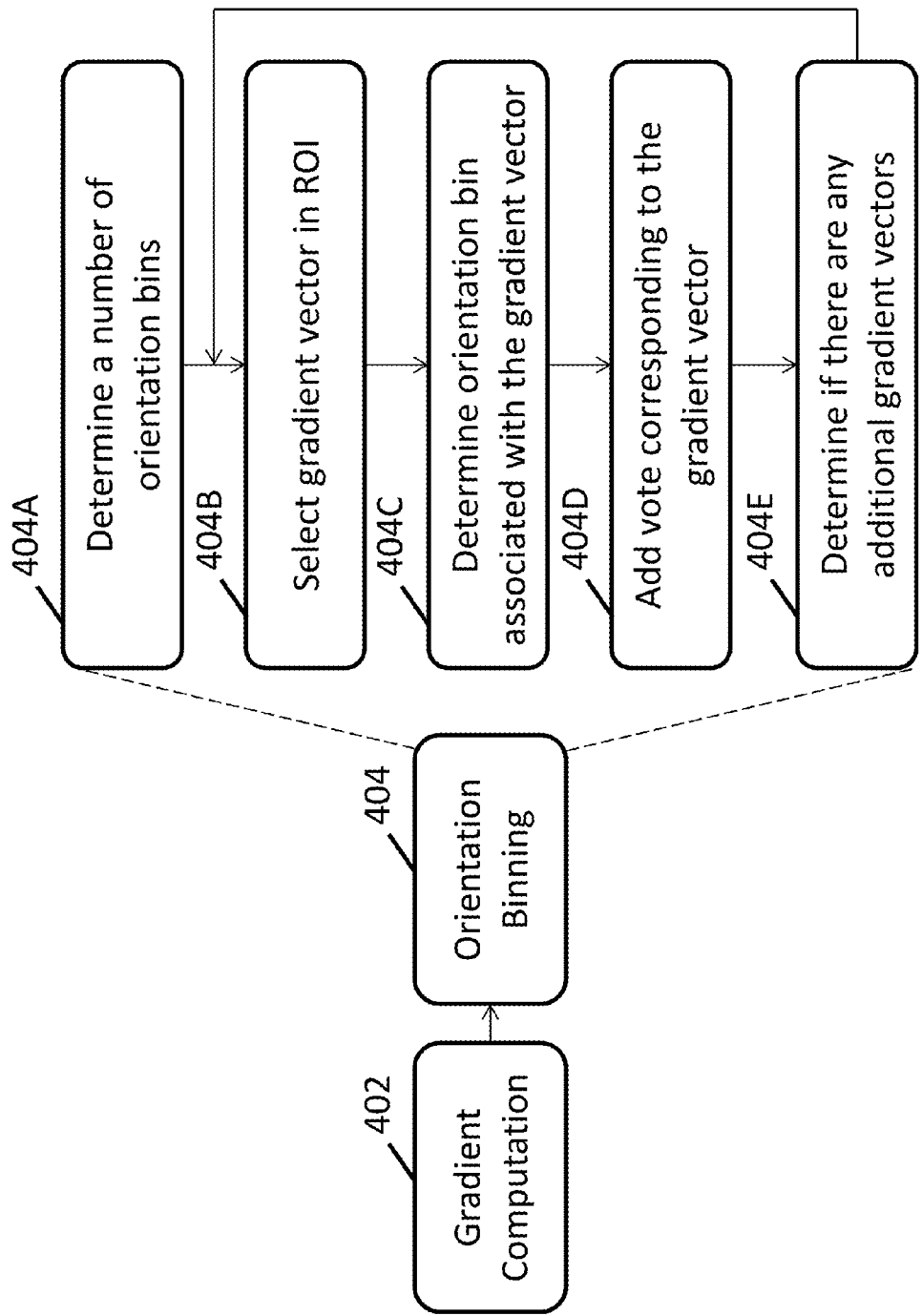
FIG. 4 illustrates a process for computing a HoG descriptor in accordance with some embodiments.

FIG. 4 illustrates a process for computing a HoG descriptor in accordance with some embodiments. The HoG descriptor module can be configured to use this process to determine a HoG descriptor for an ROI. In step 402, the HoG descriptor module can compute gradient vectors based on pixels in the ROI. In some embodiments, the HoG descriptor module can compute an x-gradient (e.g., a gradient in the horizontal direction) and a y-gradient (e.g., a gradient in the vertical direction) by convolving the ROI using one-dimensional derivative filter kernels: $[-1, 0, 1]$ and $[-1, 0, 1]^T$. In other embodiments, the HoG descriptor module can compute an x-gradient and a y-gradient by convolving the ROI using any type of filter kernels that is capable of performing derivative operations. For example, the HoG descriptor module can use a 3×3 gradient filter kernel to perform the derivative operation.

In some embodiments, a gradient vector can be represented as a two-dimensional plane vector (e.g., a vector including an x-gradient and a y-gradient); in other embodiments, a gradient vector can be represented as a vector in a polar coordinate system (e.g., a magnitude and an orientation.)

In some cases, the HoG descriptor module can be configured to compute the gradient vectors across the entire image by convolving the one-dimensional filter kernels with the entire image. In other cases, the HoG descriptor module can be configured to compute the gradient vectors in just the ROI associated with the HoG descriptor by convolving the one-dimensional filter kernels with just the ROI.

In step 404, the HoG descriptor module can bin gradient vectors that are within the ROI to generate a histogram of gradient vectors. In essence, the binning process can be understood as a voting process. The binning process is illustrated in steps 404A-404E. In step 404A, the HoG descriptor module can determine a number of orientation bins for the histogram. For example, the HoG descriptor module can determine that the number of orientation bins for the histogram is 9. In some embodiments, the orientation bins can cover a range of 0 to 180 degrees. In other embodiments, the orientation bins can cover a range of 0 to 360 degrees. In yet other embodiments, the orientation bins can cover any other suitable degree range.

In step 404B, the HoG descriptor module can select one of the gradient vectors in the ROI that has not been binned into one of the orientation bins. In step 404C, the HoG descriptor module can determine an orientation bin associated with the selected gradient vector. For example, when the orientation of the selected gradient vector is 45 degrees, the HoG descriptor module can determine that the gradient vector is associated with an orientation bin that corresponds to (e.g., covers) 45 degrees.

In step 404D, the HoG descriptor module can add a contribution (e.g., a vote) corresponding to the selected gradient vector to the orientation bin determined in step 404C. In some embodiments, the weight of the contribution can depend on a magnitude of the gradient vector. For example, the weight of the contribution can be the magnitude of the gradient vector itself As another example, the weight of the contribution can be a function of the magnitude of the gradient vector. The function can include a square root function, a square function, a clipping function, or any combinations thereof This completes the voting process for the selected gradient vector.

In step 404E, the HoG descriptor module can determine whether there are any additional gradient vectors that have not completed the voting process. If so, the HoG descriptor module can go to step 404B and iterate steps 404B-404E until all gradient vectors have completed the voting process.

Figure 5:
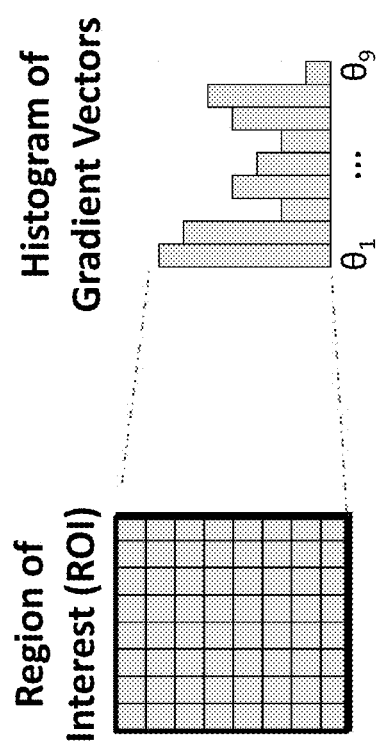
FIG. 5 illustrates a conversion of gradient vectors in an ROI into a histogram in accordance with some embodiments.

FIG. 5 illustrates a conversion of gradient vectors in an ROI into a histogram in accordance with some embodiments. FIG. 5 illustrates a scenario in which gradient vectors are binned into 9 orientation bins: $\theta_1 \ldots \theta_9$, but gradient vectors can binned into any number of orientation bins. The resulting histogram of gradient vectors becomes the HoG descriptor for the ROI.

In some embodiments, the HoG descriptor module can be configured to generate a HoG descriptor for a set of ROIs, also referred to as a block. This allows the HoG descriptor module to generate a descriptor that is able to capture relatively non-local information about a region in an image. Also, this allows the HoG descriptor module to generate a descriptor that can account for changes in illumination and contrast by grouping ROIs together into larger, spatially connected blocks and by normalizing the gradient strengths, as discussed further below.

In some embodiments, the HoG descriptor module can be configured to generate a HoG descriptor for a set of ROIs ("block HoG descriptor") by using the process illustrated in FIG. 3. For example, the HoG descriptor module can redefine a new ROI that is a union of the set of ROIs (e.g., a block), and use the process of FIG. 3 to generate a HoG descriptor for the block.

Figure 6:
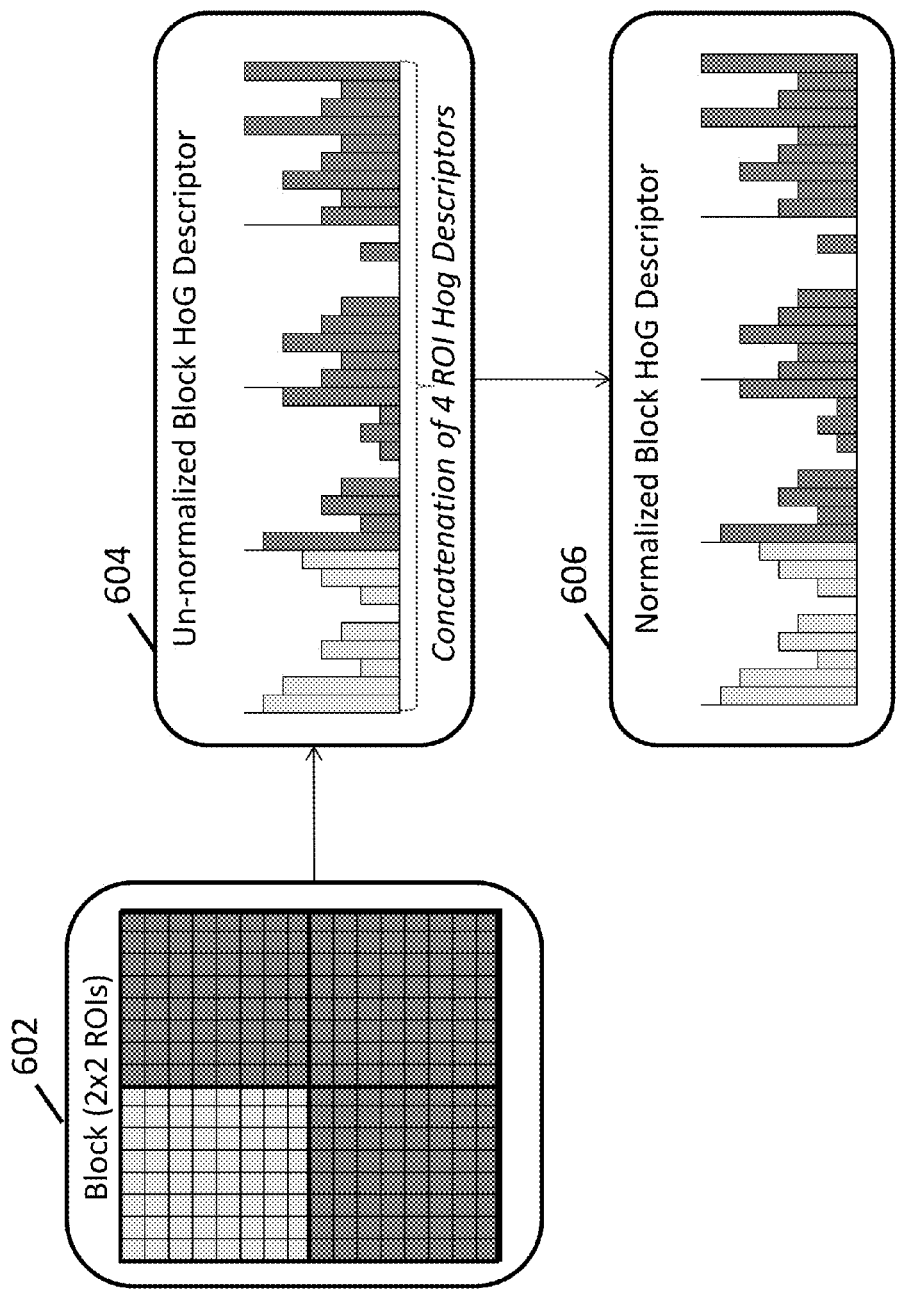
FIG. 6 illustrates a process for generating a block HoG descriptor by concatenating HoG descriptors of ROIs in accordance with some embodiments.

As another example, the HoG descriptor module can be configured to generate a HoG descriptor for a block by concatenating HoG descriptors for each of the ROIs in the block. In some cases, the HoG descriptor module can modify the number of ROIs in a block. This way, the HoG descriptor module can modify the length of the block HoG descriptor. FIG. 6 illustrates a process for generating a block HoG descriptor by concatenating HoG descriptors of ROIs in accordance with some embodiments. Although FIG. 6 illustrates a scenario in which a block includes four ROIs, a block can include any number of ROIs. In step 602, the HoG descriptor module can identify the set of ROIs for which to generate a HoG descriptor. In this example, the HoG descriptor module is configured to generate a HoG descriptor for a block that includes four ROIs.

In step 604, the HoG descriptor module can concatenate HoG descriptors for each of the ROIs in the block. For example, as illustrated in FIG. 5, a HoG descriptor for an ROI ("an ROI HoG descriptor") can have 9 dimensions. After concatenating four HoG descriptors corresponding to ROIs, the HoG descriptor for the block ("a block HoG descriptor") can have 36 dimensions. In other examples, an ROI HoG descriptor can have any other number of dimensions (e.g., 18, 36), and the dimension of a block HoG descriptor can scale according to the dimension of an ROI HoG descriptor and the number of ROIs in the block.

In step 606, the HoG descriptor module can optionally normalize the block HoG descriptor. The normalization process can transform the block HoG descriptor to provide better invariance to changes in illumination or shadowing that arise in real-world conditions. In some embodiments, as illustrated in FIG. 6, the HoG descriptor module can normalize the block HoG descriptor using a L-2 norm. For example, block HoG descriptor can be normalized using the relationship:

$$v \rightarrow \frac{v}{\sqrt{\|v\|_2^2 + \varepsilon^2}},$$

where v refers to the block HoG descriptor, and $\varepsilon$ refers to a small value for preventing division by zero. In other embodiments, the HoG descriptor module can normalize the block HoG descriptor using a L-2 hysteresis norm, a L-1 norm, a L-1 square-root norm, or any other type of normalization functions.

In some embodiments, the HoG descriptor module can be configured to apply a Gaussian spatial filter within a block of ROI before generating the block HoG descriptor.

In some embodiments, the HoG descriptor module can be configured to determine a HoG descriptor for a HoG detection window, which may include a large number of ROIs. In this case, the HoG descriptor module can be configured to extract blocks of ROIs from the HoG detection window, determine the block HoG descriptor for each of the extracted blocks, and concatenate the block HoG descriptors to generate the HoG descriptor for the HoG detection window.

In some embodiments, the HoG descriptor module can be configured to extract blocks from the detection window in a sliding-window manner. For example, the HoG descriptor module can overlay an extraction window on a detection window at one corner of the detection window. The size of the extraction window can be the same as the size of the desired block. The HoG descriptor module can extract a first block of ROIs by sampling the ROIs covered by the extraction window. Subsequently, the HoG descriptor module can move the extraction window by one ROI, and sample the ROIs covered by the moved extraction window. This process can be iterated until the "sliding" extraction window covers the entire detection window.

Figure 7:
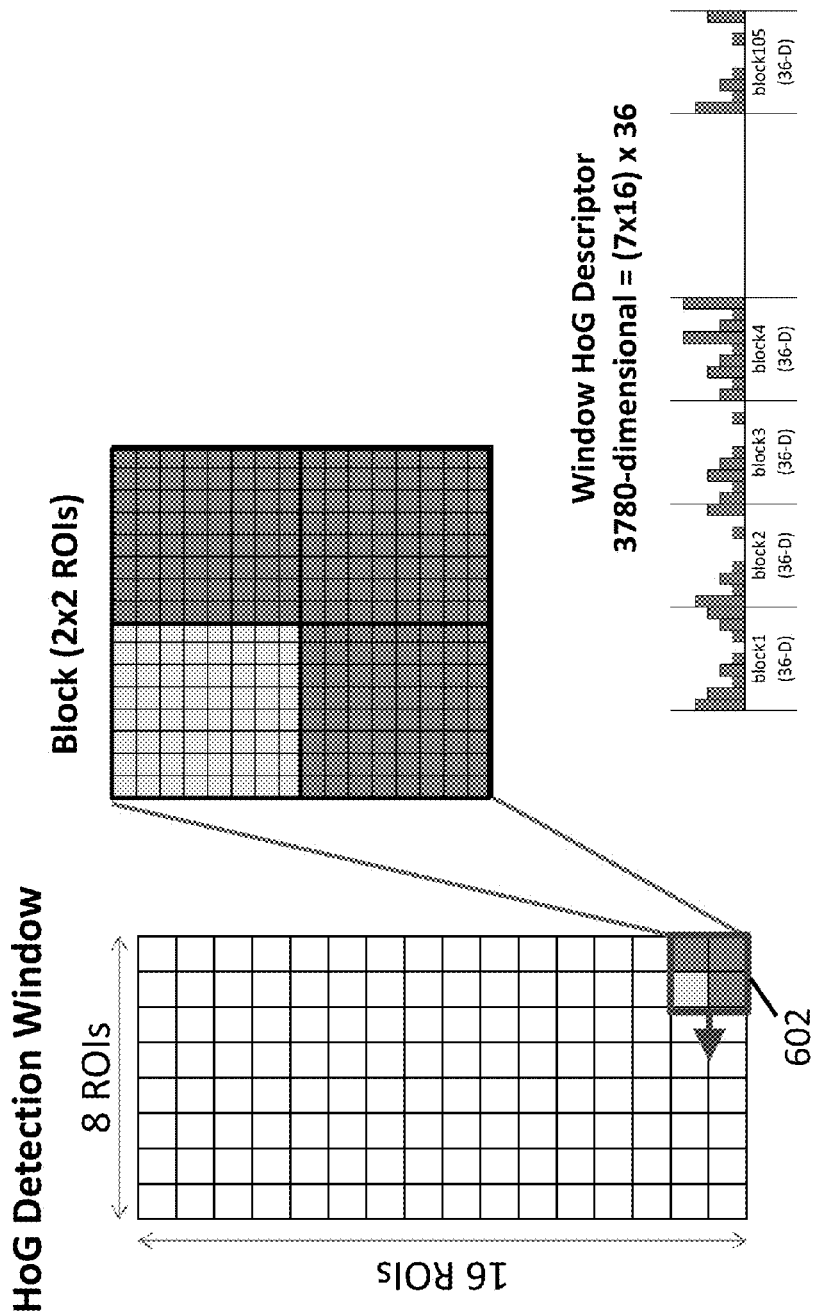
FIG. 7 illustrates a process for generating a HoG descriptor for a HoG detection window in accordance with some embodiments.

FIG. 7 illustrates a process for generating a HoG descriptor for a HoG detection window in accordance with some embodiments. The detection window has 16×8 ROIs, and the HoG descriptor module is configured to generate (15×7) blocks by sliding an extraction window 602 across the HoG detection window. The HoG descriptor module can generate a block HoG descriptor for each of the generated blocks, and concatenate them to generate a window HoG descriptor. In this case, since each block HoG descriptor has 36 dimensions, the window HoG descriptor is 3780 dimensional.

Once HoG descriptors are generated, the descriptors can be used in a back-end system, such as an object recognition system or an object detection system, using a machine learning technique, such as a support vector machine.

In some embodiments, the block of ROIs can have a rectangular geometry, as illustrated in FIG. 6. The rectangular block of ROIs generally include square grids, represented by the following parameters: the number of ROIs per block, the number of pixels per ROI, and the number of channels per histogram. Block HoG descriptors based on a rectangular block of ROIs appear similar to Scale Invariant Feature Transform (SIFT) descriptors. In other embodiments, the block of ROIs can have a circular geometry. In some cases, the circular geometry can be found in several variants, including those with a single, central cell and those with an angularly divided central cell. The circular geometry of the block of ROIs can be represented using characteristic parameters, which can include the number of angular and radial bins, the radius of the center bin, and the expansion factor for the radius of additional radial bins.

Figure 8:
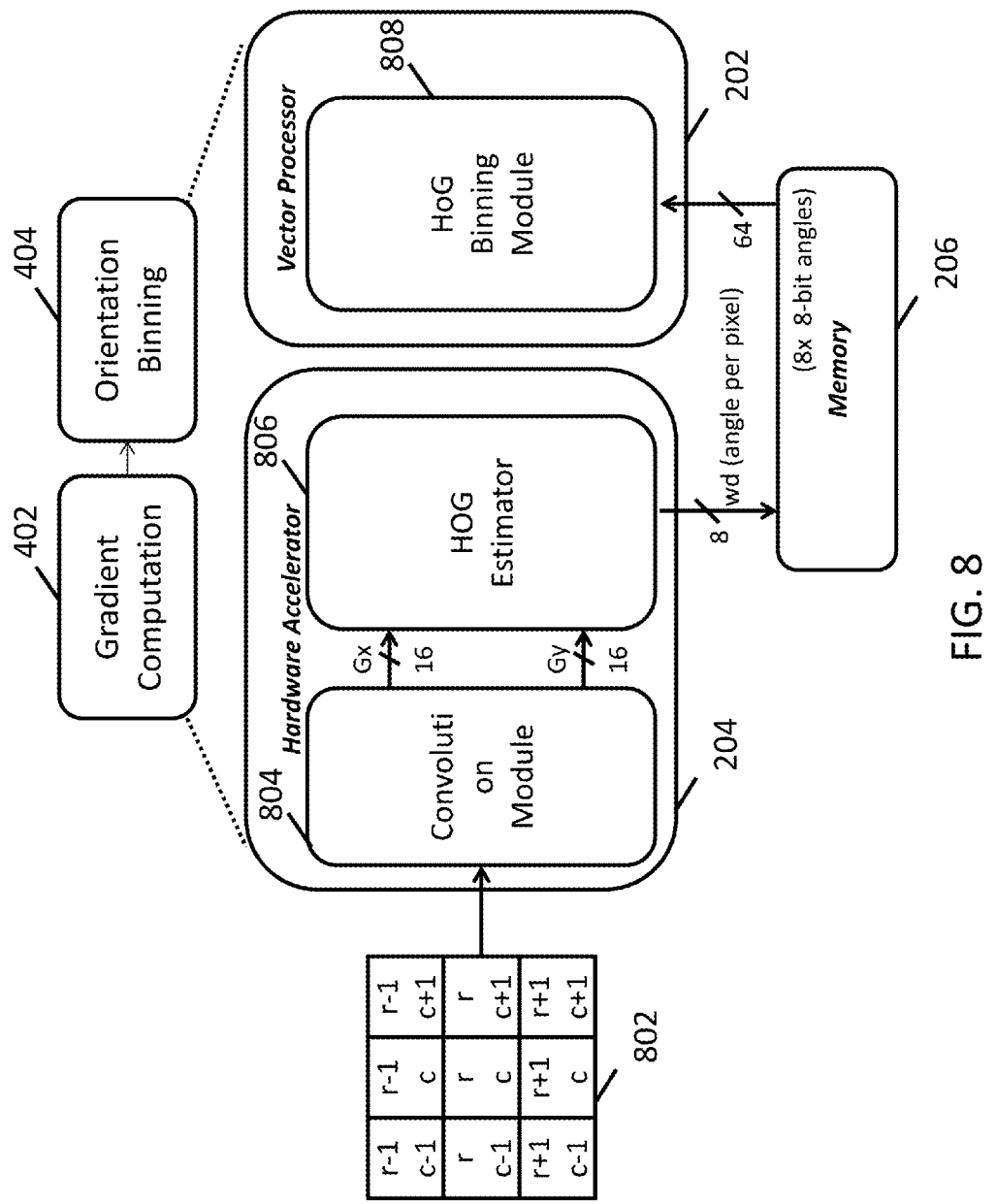
FIG. 8 illustrates a processing system for computing an ROI HoG descriptor in accordance with some embodiments.

FIG. 8 illustrates a processing system for computing an ROI HoG descriptor in accordance with some embodiments. The HoG descriptor module can be implemented using a hardware accelerator 204 and a vector processor 202. For example, the hardware accelerator 204 can be configured to perform filtering operations, such as a convolution of an ROI with derivative filters. On the other hand, the vector processor 202 can be configured to generate a histogram of gradient vectors generated by the hardware accelerator 204.

The hardware accelerator 204 of the HoG descriptor module can include a convolution module. The convolution module can be configured to convolve one or more gradient filters with the underlying ROI. In some embodiments, the convolution module can be implemented using a filter module of the hardware accelerator 202. For example, a filter module of a hardware accelerator 202 can be programmed in accordance with the functionality of the convolution module.

Figure 9:
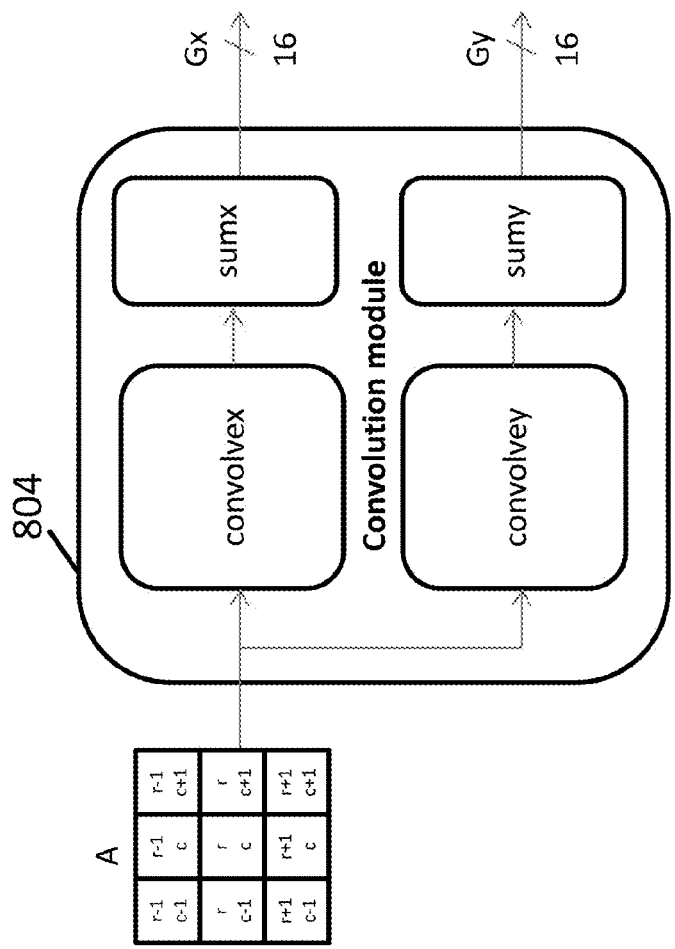
FIG. 9 illustrates a convolution module in accordance with some embodiments.

In some embodiments, the gradient filter can include a variation of a Sobel filter. FIG. 9 illustrates a convolution module in accordance with some embodiments. The convolution module 804 can further include an x-directional convolution module and a y-directional convolution module so that the convolution module 804 can compute the x-directional gradient and the y-direction gradient in parallel. In some embodiments, the convolution module 804 can generate an output in a 16-bit floating-point representation and provide the output to the HoG estimator 806.

In some embodiments, the HoG estimator 806 can be configured to receive a gradient vector and determine an orientation of the gradient vector. The orientation can be measured by an angle that the gradient vector makes with respect to an x-axis, but other methods of measuring the orientation can also be used.

The orientation angle $\phi$ of a gradient vector can lie between 0° and 360°, depending on the magnitude and polarity of the x-gradient (e.g., a gradient component along the x-axis) and the y-gradient (e.g., a gradient component along the y-axis). The x-gradient and the y-gradient can be represented as X and Y, respectively.

Figure 10:
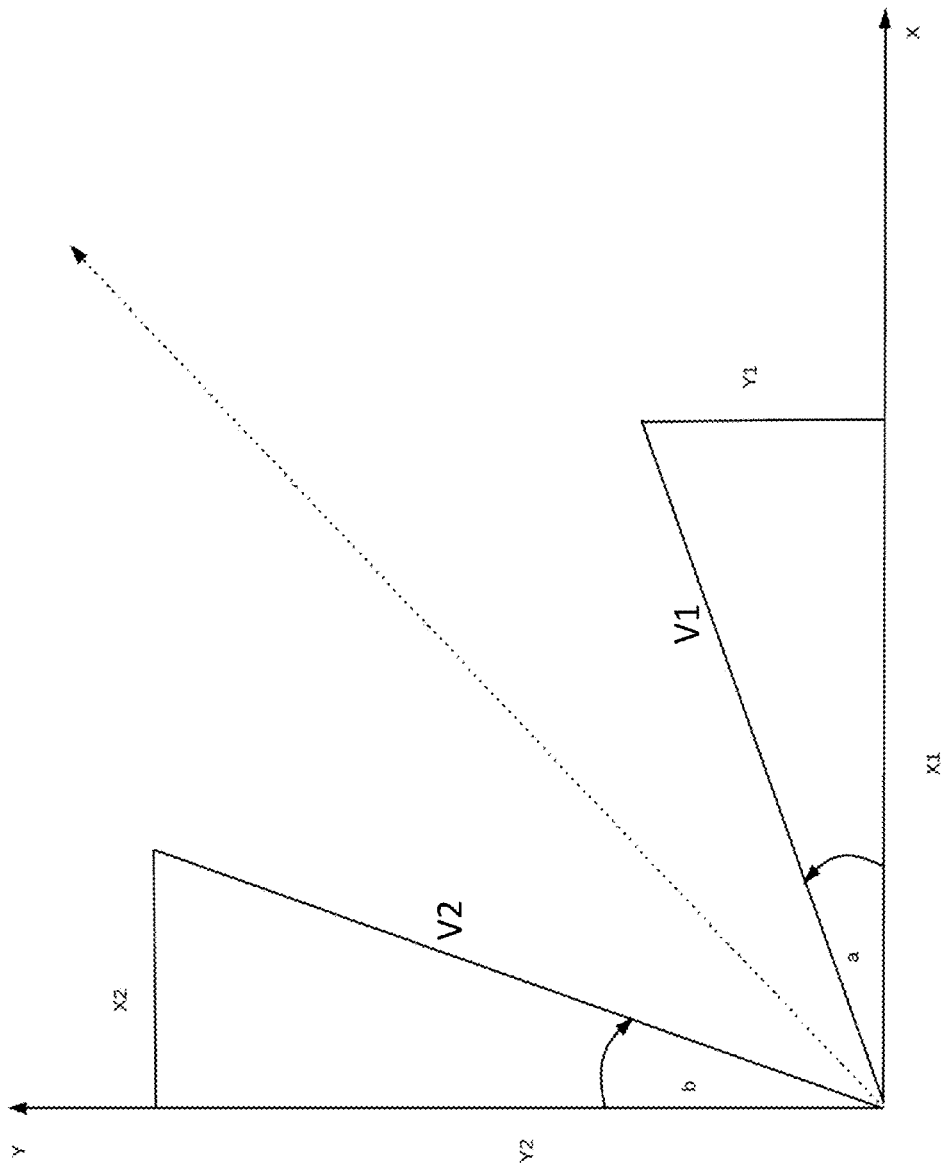
FIG. 10 illustrates a process for determining a primary angle θ in accordance with some embodiments.

In order to determine the orientation angle φ, the HoG estimator 806 can first determine a primary angle θ based on the absolute value of X and Y. FIG. 10 illustrates a process for determining a primary angle θ in accordance with some embodiments. FIG. 10 illustrates two vectors: V1=[X1, Y1] and V2=[X2, Y2]. When the absolute value of X is greater than the absolute value of Y, as in the case of V1, then then primary angle θ is set to be "a":

$$\theta=a, |X|>|Y|;$$

When the absolute value of X is less than or equal to the absolute value of Y, as in the case of V2, then then primary angle θ is set to be "b":

$$\theta=b, |Y|\geq|X|;$$

Therefore, the primary angle θ is designed to lie between 0° and 45°.

In some embodiments, the primary angle θ can be represented as an integer. For example, the HoG estimator 806 can divide the range of 0° and 45° into smaller orientation bins. In this case, the HoG estimator 806 can associate each orientation bin with an index to represent the orientation bins as integers. For example, when each orientation bin covers 2.5°, the range of 0° and 45° can be divided into 18 bins. Therefore, each bin can be represented as a number between 0 and 17.

In some embodiments, the HoG estimator 806 can determine an orientation bin index for a gradient vector using an angle index table. FIG. 11 illustrates an angle index table in accordance with some embodiments. The angle index table can indicate a relationship between a bin index (e.g., position), an angle, and/or a tangent of an angle. The tangent of a primary angle θ can be easily computed based on a ratio between X and Y. For example, the HoG estimator 806 can use the following relationship to determine the tangent of a primary angle θ:

$$\tan(\theta)=N/D=|Y|/|X|, \text{ when } |X|>|Y|;$$

$$\tan(\theta)=N/D=|X|/|Y|, \text{ when } |Y|>|X|;$$

Therefore, the HoG estimator 806 can easily determine a bin index of a gradient vector using the tangent of a primary angle θ associated with the gradient vector.

Once the HoG estimator 806 determines the primary angle θ, the HoG estimator 806 can use the primary angle θ to determine the orientation angle φ of the gradient vector. As discussed in the example provided above, the HoG estimator 806 can bin an angle at a step of 2.5 °. Therefore, the HoG estimator 806 can represent the orientation angle φ, within the range of 0 and 360°, using 144 bins. In this case, the HoG estimator 806 can use the following relationship to convert the primary angle θ into the orientation angle φ:

$$\phi=\theta, \text{ if } |X|\geq|Y|, X\geq0, Y\geq0;$$

$$\phi=35-\theta, \text{ if } |Y|>|X|, X\geq0, Y\geq0;$$

$$\phi=36+\theta, \text{ if } |Y|>|X|, X<0, Y\geq0;$$

$$\phi=71-\theta, \text{ if } |X|\geq|Y|, X<0, Y\geq0;$$

$$\phi=72+\theta, \text{ if } |X|\geq|Y|, X<0, Y<0;$$

$$\phi=107-\theta, \text{ if } |Y|>|X|, X<0, Y<0;$$

$$\phi=108+\theta, \text{ if } |Y|>|X|, X\geq0, Y<0;$$

$$\phi=143-\theta, \text{ if } |X|\geq|Y|, X\geq0, Y<0;$$

where the primary angle θ and the orientation angle φ are represented as a bin index. Through this process, the HoG estimator 806 can associate a gradient vector with an orientation bin.

Figure 12:
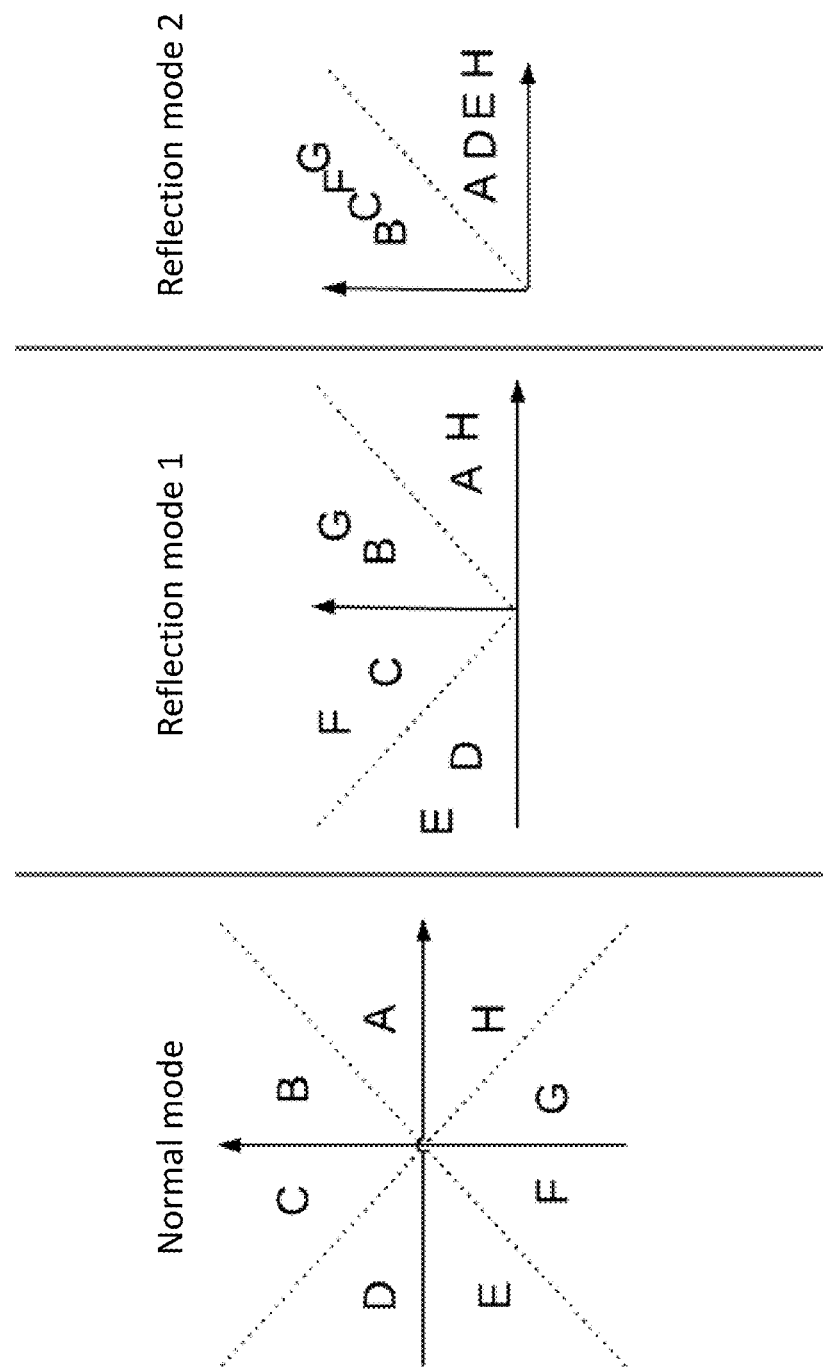
FIG. 12 illustrates a reflection mode representation of an orientation angle in accordance with some embodiments.

In some embodiments, the HoG estimator 806 can represent an orientation angle φ in a reflection mode. In a reflection mode, the HoG estimator 806 can limit the range of an orientation angle φ. FIG. 12 illustrates a reflection mode representation of an orientation angle in accordance with some embodiments. In a reflection mode, the HoG estimator 806 can reflect a gradient vector (or corresponding orientation bins) across one or more axes to limit the range of an orientation angle θ. For example, as represented by the "Reflection mode 1," the HoG estimator 806 can limit the orientation angle φ to be within the range of 0° and 180° by reflecting orientation bins across the x-axis. In this case, when each bin covers 2.5°, the bin index for the orientation angle φ can range between 0 and 71. As another example, as represented by the "Reflection mode 2," the HoG estimator 806 can limit the orientation angle φ to be within the range of 0° and 90° by reflecting orientation bins across both the x-axis and the y-axis. In this case, when each bin covers 2.5°, the bin index for the orientation angle φ can range between 0 and 35. The availability of reflection modes allows the HoG estimator 806 to control the dimension of the HoG descriptor.

Once the HoG estimator 806 identifies an orientation angle φ for a gradient vector, the HoG estimator 806 can provide that information to the HoG binning module 808. In some embodiments, the HoG estimator 806 can provide the orientation angle information to the HoG binning module 808 directly. In other embodiments, the HoG estimator 806 can store the orientation angle information in a memory device 206. This way, the HoG binning module 808 can retrieve the orientation angle information when the HoG binning module 808 compares the orientation angle against orientation bin thresholds for generating a histogram of gradients. In some cases, the memory 206 can store the orientation angle individually (e.g., in a random access manner). In other cases, the memory 206 can store the orientation angle as a set (e.g., a set including orientation angles for 8 pixels) to reduce the number of memory transactions for retrieving orientation angle information.

Subsequently, the HoG binning module 808 can add a contribution to the determined orientation angle φ based on the magnitude of the gradient vector, as discussed above. In some embodiments, the voting (e.g., contribution) process is iterated for each of the gradient vectors sequentially. In other embodiments, the voting process is performed for multiple gradient vectors in parallel using the parallel computing platform within the vector processor 202.

As illustrated in FIG. 8, in some embodiments, the HoG binning module 808 can be implemented in software and can be executed by a vector processor 202. Implementing the HoG binning module 808 in software on the vector processors can simplify the hardware design and can allow for any number of orientation bins to be used for HoG descriptors.

Figure 13A:
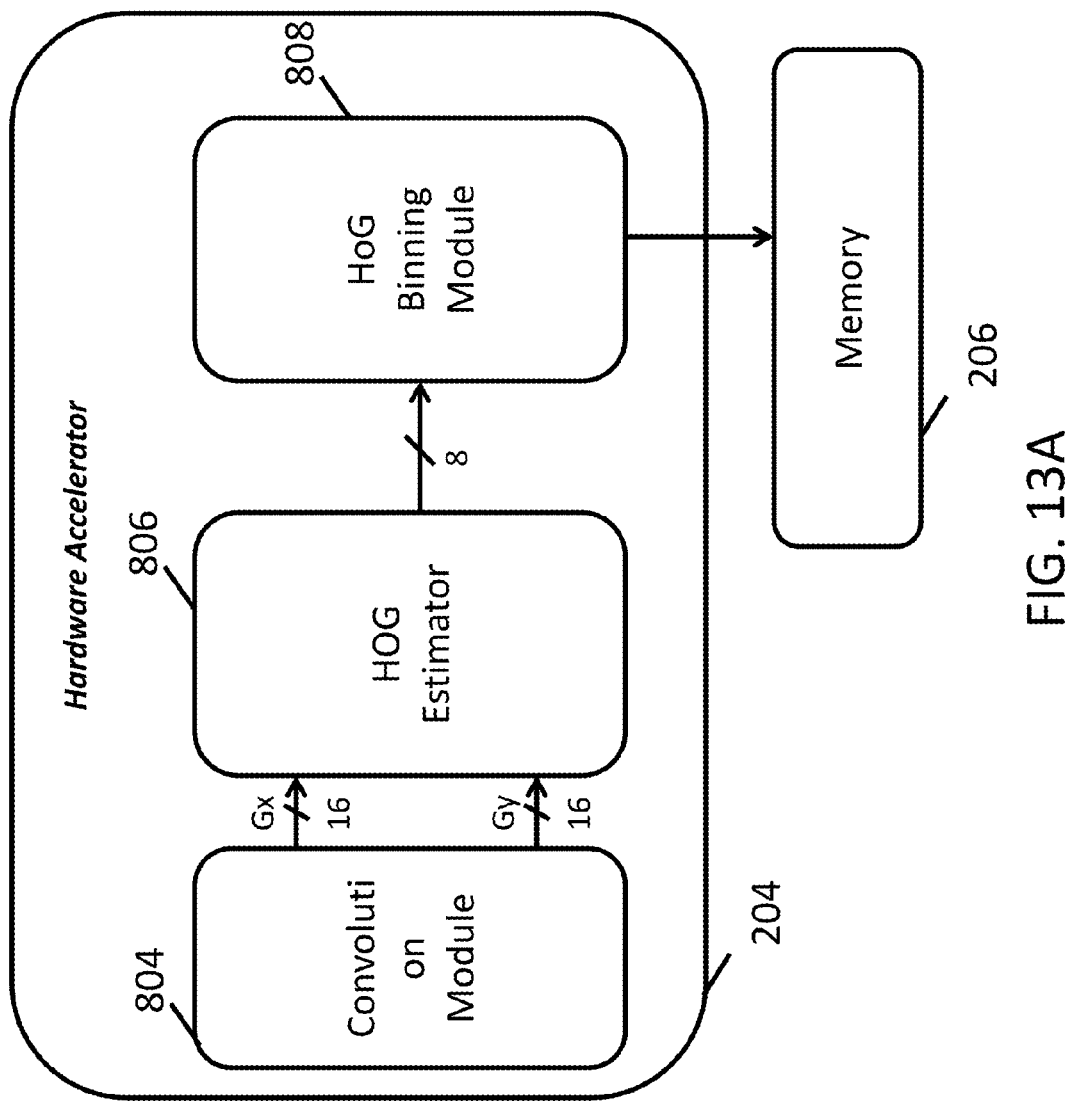
FIG. 13A illustrates a processing system having a hardware accelerator that includes a HoG binning module in accordance with some embodiments.

In other embodiments, the HoG binning module 808 can be implemented in hardware as a part of a hardware accelerator 204. FIG. 13A illustrates a processing system having a hardware accelerator that includes a HoG binning module in accordance with some embodiments. The advantage of implementing the HoG binning module in a hardware accelerator 204 can include low power consumption. The use of a hardware-based HoG binning module can be especially desirable when the maximum number of orientation bins for a HoG descriptor can be determined at design time.

Figure 13B:
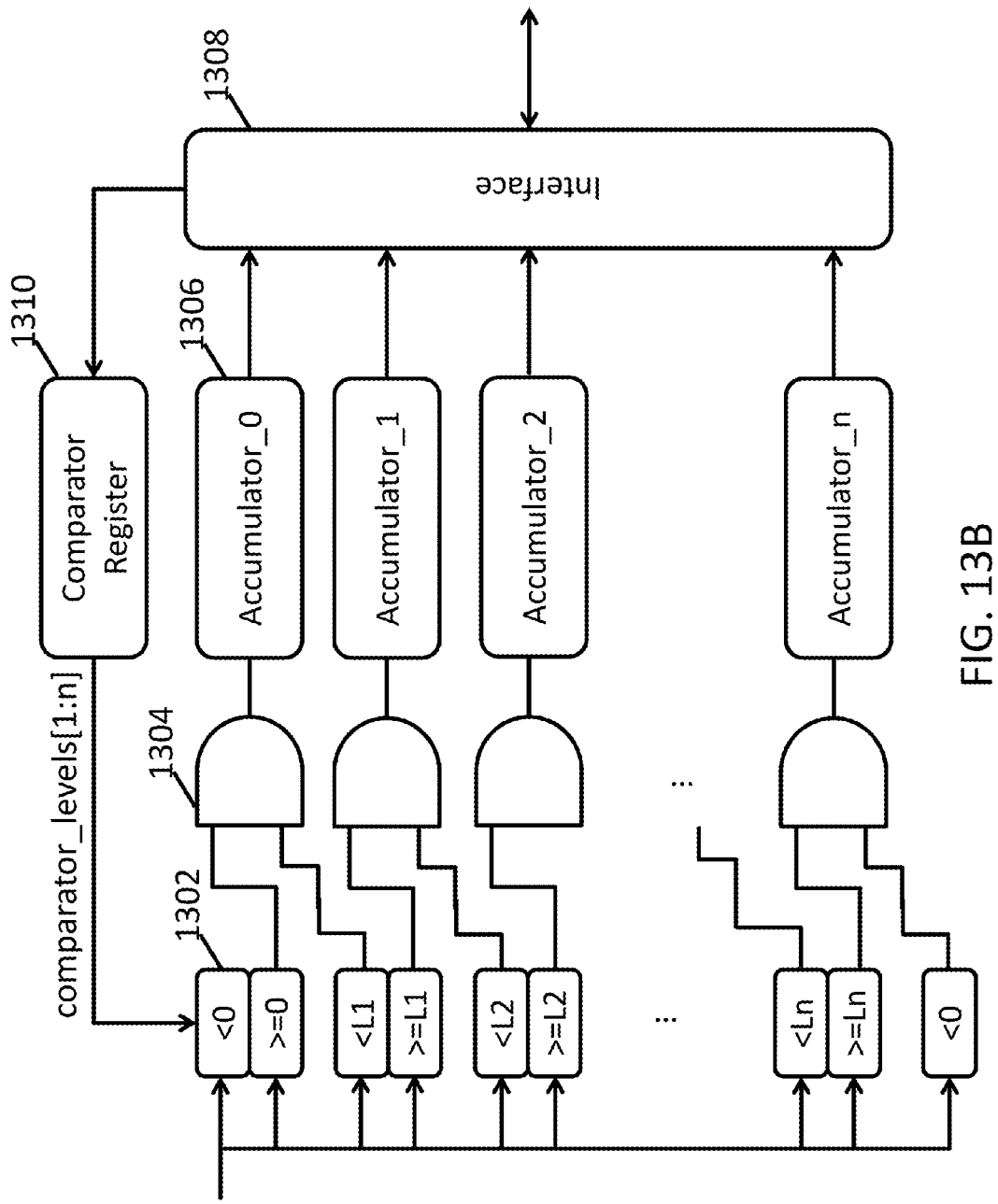
FIG. 13B illustrates a hardware-based HoG binning module in accordance with some embodiments.

FIG. 13B illustrates a hardware-based HoG binning module in accordance with some embodiments. The hardware-based HoG binning module can include a plurality of comparators 1302, a plurality of logic gates 1304 for compiling information from the comparators 1302, a plurality of accumulators 1306 that count the number of angles in one of a plurality of orientation bins, an interface 1308 for communicating the information from the accumulators 1306, and a comparator register 1310 that provides orientation thresholds $L_1, \ldots L_n$, for orientation bins to be used by the plurality of comparators 1302.

When the HoG binning module receives an orientation angle φ for a particular pixel, the orientation angle φ is compared against orientation bin thresholds that define the lower and upper limits of orientation bins. For example, when the orientation angle φ falls within an orientation bin i, two comparators corresponding to the orientation bin i (e.g., a first comparator that determines whether the orientation angle φ is greater than a first threshold L, and a second comparator that determines whether the orientation angle φ is less than or equal to a second threshold $L_{i+1}$) can output a logic "high" signal. The logic gate 1304 corresponding to the orientation bin i can determine that the two comparators have outputted a logic "high" signal. For example, the logic gate 1304 can perform a logical "AND" operation on the signals from the comparators. If the output of the AND operation is a logic "high", then the logic gate 1304 can determine that the two comparators have outputted a logic "high" signal, and that the orientation angle φ falls within an orientation bin i.

Subsequently, the logic gate 1304 can provide an indication to the accumulator corresponding to the orientation bin i that the orientation angle φ is within the orientation bin i, and the accumulator increases the value of the orientation bin i by 1. This way, the HoG binning module can count the number of pixels having an orientation angle φ that falls within a particular orientation bin. In some cases, when an orientation angle φ is within an orientation bin i, the corresponding accumulator 1306 can be configured to increase its count by a value that is related to the magnitude of the gradient vector for the particular pixel.

In some embodiments, when a desired HoG descriptor does not need to include the maximum number of orientation bins supported by the HoG binning module, the HoG binning module can be configured to combine a plurality of orientation bins to make a coarser orientation bin.

Figure 14:
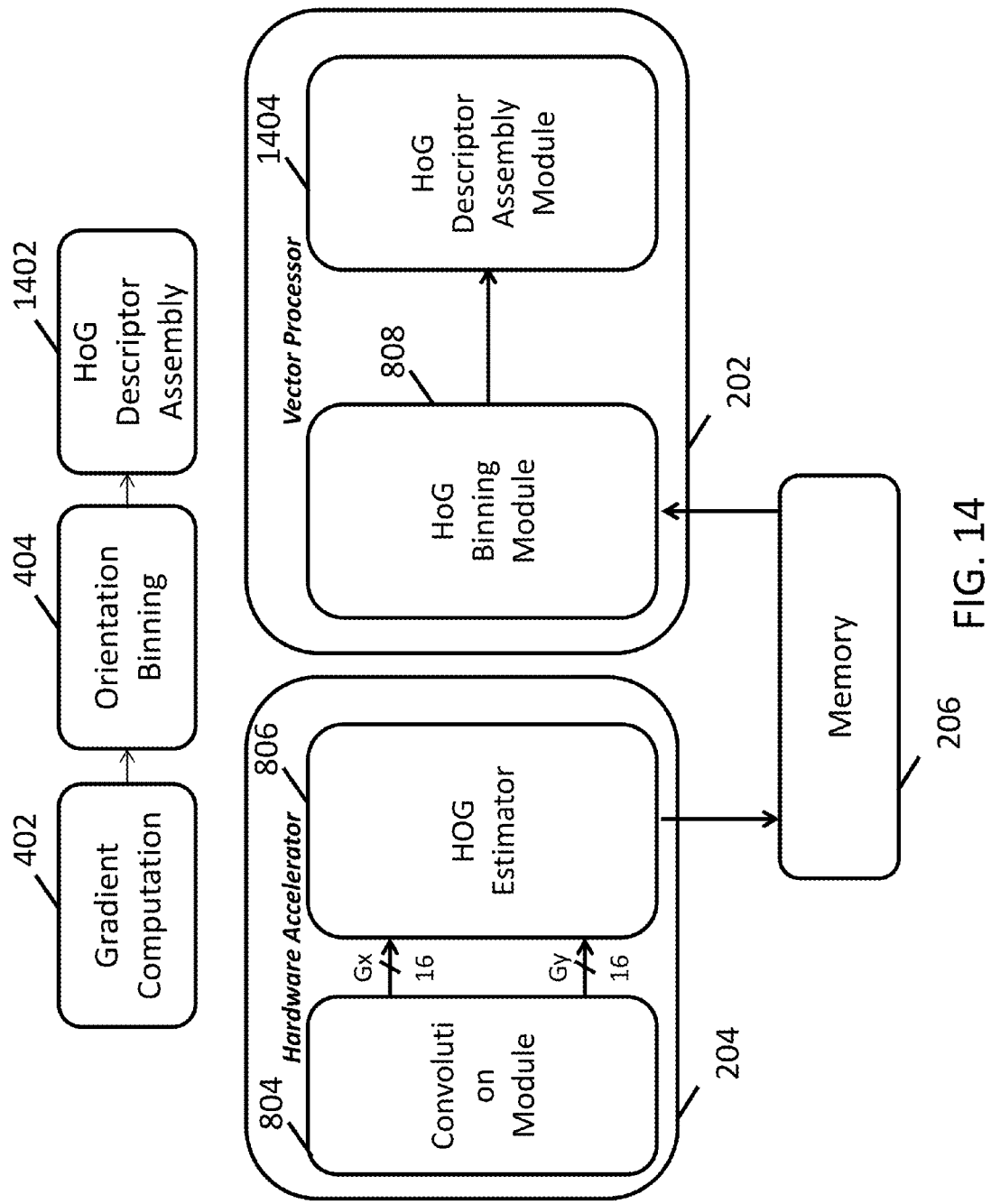
FIG. 14 illustrates process and hardware for generating a block HoG descriptor or a window HoG descriptor in accordance with some embodiments.

FIG. 14 illustrates process and hardware for generating a block HoG descriptor or a window HoG descriptor in accordance with some embodiments. Once the vector processor generates one or more HoG descriptors for ROIs, the vector processor 202 may generate a block HoG descriptor or a window HoG descriptor based on the one or more HoG descriptors, as discussed above. This process is referred to as a HoG descriptor assembly process 1402. In some embodiments, the HoG descriptor assembly step 1402 can be performed by a HoG descriptor assembly module 1404.

In some embodiments, the HoG descriptor assembly module 1404 can be configured to concatenate one or more HoG descriptors for ROIs, and optionally, normalize the concatenated HoG descriptors to generate a block HoG descriptor or a window HoG descriptor.

In some embodiments, the HoG descriptor assembly module 1404 can be configured to normalize values in the concatenated HoG descriptors. To this end, the HoG descriptor assembly module 1404 is configured to determine a normalization constant associated with the concatenated HoG descriptors. The normalization constant can be the norm of a gradient vector. Computing the norm of a gradient vector can involve computing a square root function. For example, the HoG descriptor assembly module 1404 can be configured to compute the norm of a gradient vector using the following relationship:

$$M = \sqrt{X^2 + Y^2} = |X|\sqrt{1 + \left(\frac{Y}{X}\right)^2} \quad \text{if } |X| > |Y|;$$

$$M = \sqrt{X^2 + Y^2} = |Y|\sqrt{1 + \left(\frac{X}{Y}\right)^2} \quad \text{if } |X| \le |Y|.$$

In some embodiments, the HoG descriptor assembly module 1404 can compute an approximation of a function of the form shown below to approximate the normalization constant M:

$$\{f(a) = \sqrt{1+a^2} \text{ where } 0 < a \le 1\}$$

In some embodiments, the approximation involves dividing the range of "a" into a predetermined number of bins, pre-computing the value of f(a) for boundaries of these bins, and storing the precomputed values in a normalization table.

FIG. 15 shows a normalization table in accordance with some embodiments. In this illustration, the HoG descriptor assembly module 1404 is configured to divide the range of "a" into 16 bins. Therefore, the HoG descriptor assembly module 1404 is configured to maintain a table that has values of f(a) for 17 boundary values of "a." In some embodiments, the values of f(a) can be stored in a high precision format. For example, the values of f(a) can be stored in a sixteen-bit floating-point (fp16 or half) format.

The HoG descriptor assembly module 1404 can be configured to use the values in the normalization table to determine the value of f(a) for an arbitrary values of "a." In some embodiments, the HoG descriptor assembly module 1404 determines the value of f(a) for an arbitrary values of "a" by linearly interpolating the values of f(a) present in the normalization table.

For example, when X=156 and Y=268, the HoG descriptor assembly module 1404 can perform the following operations to approximate $$M = \sqrt{X^2 + Y^2} = |Y|\sqrt{1 + \left(\frac{X}{Y}\right)^2}.$$

Since the ratio of X and Y fall between 0.5625 and 0.625, the HoG descriptor assembly module 1404 can perform the linear interpolation of entries 10 and 11 in the normalization table:

$$0.5821 - 0.5625 = 0.0196$$

$$0.625 - 0.05821 = 0.0429$$

$$\frac{(0.0196 \times 1.17924) + (0.0429 \times 1.14734)}{0.0196 + 0.0429} = 1.15734$$

$$1.15734 \times |Y| = 1.15754 \times 268 = 310.16$$

$$\sqrt{156^2 + 268^2} = 310.096 \cong 310.16$$

This final value is then scaled depending on the contents of a programmable register configuration and the desired output mode.

In some embodiments, the HoG descriptor module is capable of processing up to 16 planes of 8-bit data using a programmable convolution module. The HoG descriptor module can be programmed to filter input data using a Sobel operator or a variation thereof, and produce up to 16 planes of 16 bit/8 bit output data. The operation of the programmable convolution module is configurable via processor read/writeable registers. In some cases, the programmable convolution module can be supported by a multi-line input buffer. The input buffer can be of sufficient size to store the convolution kernel (e.g., a Sobel operator) and an additional line. For example, in the case of a 3×3 filter kernel, the input buffer can be configured to accommodate 4 lines of data. The buffer can be configured to store overlapping ranges of lines as the angles are calculated from the center-pixel plus or minus a range determined by the size of the filter kernel. Using overlapping ranges in hardware usually means that information from the previous operation does not need to be refetched from memory and each line streams through the line store saving bandwidth and power.

In some embodiments, the vector processor 202 can be configured to use the HoG descriptor to perform object recognition and/or object detection. For example, the vector processor 202 can include a recognition module that uses a support vector machine (SVM) to compare the HoG descriptor to a database of HoG descriptors and, based on the comparison result, determine an object associated with the HoG descriptor.

Figure 16:
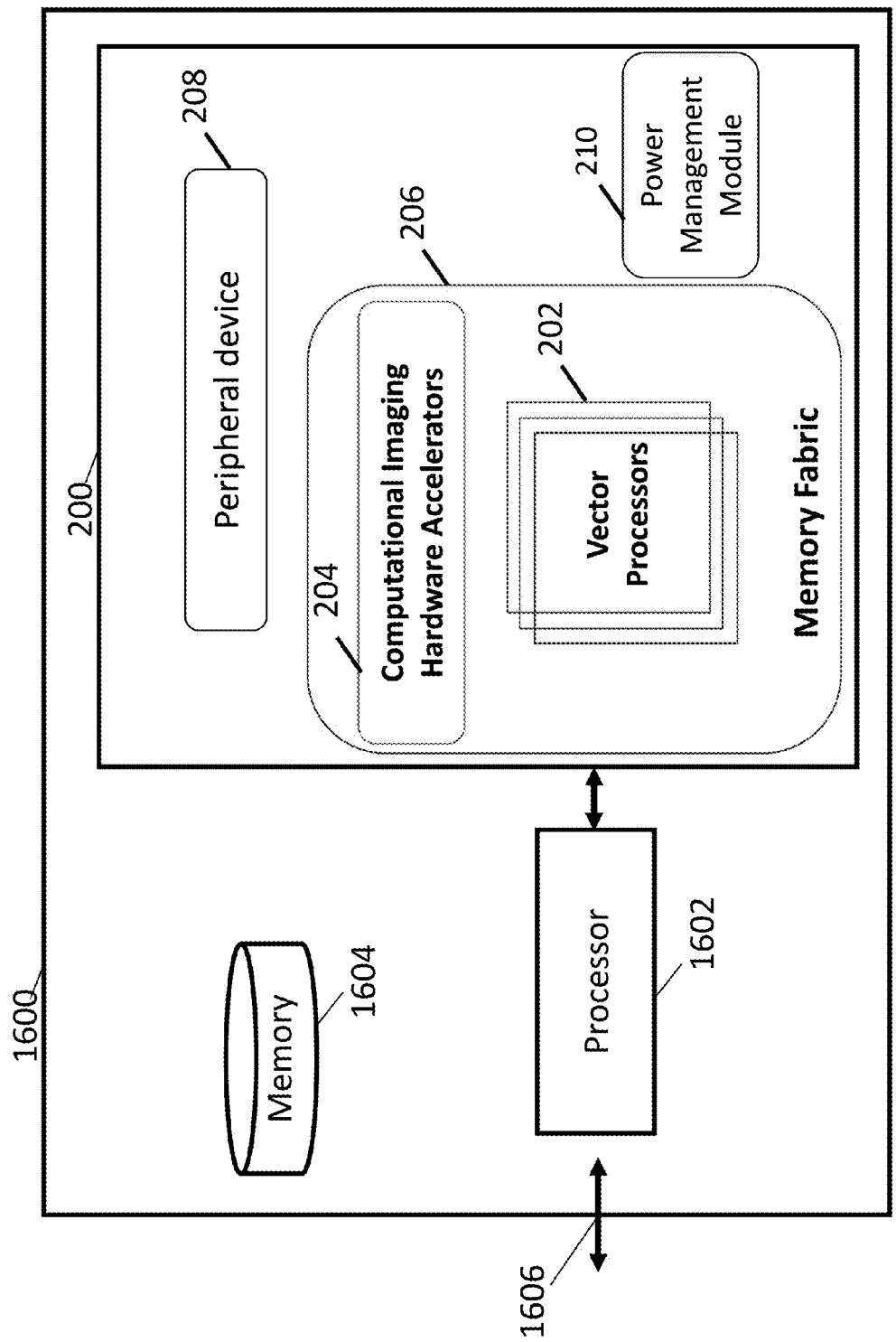
FIG. 16 illustrates an electronic device that includes the computing device in accordance with some embodiments.

In some embodiments, the parallel computing device 100 can reside in an electronic device. FIG. 16 illustrates an electronic device that includes the computing device in accordance with some embodiments. The electronic device 1600 can include a processor 1602, memory 1604, one or more interfaces 1606, and the computing device 200.

The electronic device 1600 can be configured with one or more processors 1602 that process instructions and run software that may be stored in memory 1604. The processor 1602 can also communicate with the memory 1604 and interfaces 1606 to communicate with other devices. The processor 1602 can be any applicable processor such as a system-on-a-chip that combines a CPU, an application processor, and flash memory, or a reduced instruction set computing (RISC) processor.

The memory 1604 can be a non-transitory computer readable medium, flash memory, a magnetic disk drive, an optical drive, a programmable read-only memory (PROM), a read-only memory (ROM), or any other memory or combination of memories. The software can run on a processor capable of executing computer instructions or computer code. The processor might also be implemented in hardware using an application specific integrated circuit (ASIC), programmable logic array (PLA), field programmable gate array (FPGA), or any other integrated circuit.

The interfaces 1606 can be implemented in hardware or software. The interfaces 1606 can be used to receive both data and control information from the network as well as local sources, such as a remote control to a television. The electronic device can also provide a variety of user interfaces such as a keyboard, a touch screen, a trackball, a touch pad, and/or a mouse. The electronic device may also include speakers and a display device in some embodiments.

In some embodiments, a processing unit, such as a vector processor 202 and a hardware accelerator 204, in the computing device 200 can include an integrated chip capable of executing computer instructions or computer code. The processor might also be implemented in hardware using an application specific integrated circuit (ASIC), programmable logic array (PLA), field programmable gate array (FPGA), or any other integrated circuit.

In some embodiments, the computing device 200 can be implemented as a system on chip (SOC). In other embodiments, one or more blocks in the computing device 200 can be implemented as a separate chip, and the parallel computing device can be packaged in a system in package (SIP). In some embodiments, the computing device 200 can be used for data processing applications. The data processing applications can include image processing applications and/or video processing applications. The image processing applications can include an image processing process, including an image filtering operation; the video processing applications can include a video decoding operation, a video encoding operation, a video analysis operation for detecting motion or objects in videos. Additional applications of the computing device 200 can include machine learning and classification based on sequence of images, objects or video and augmented reality applications including those where a gaming application extracts geometry from multiple camera views including depth enabled cameras, and extracts features from the multiple views from which wireframe geometry (for instance via a point-cloud) can be extracted for subsequent vertex shading by a GPU.

The electronic device 1600 can include a mobile device, such as a cellular phone. The mobile device can communicate with a plurality of radio access networks using a plurality of access technologies and with wired communications networks. The mobile device can be a smartphone offering advanced capabilities such as word processing, web browsing, gaming, e-book capabilities, an operating system, and a full keyboard. The mobile device may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The mobile device may have the capability to run applications or communicate with applications that are provided by servers in the communications network. The mobile device can receive updates and other information from these applications on the network.

The electronic device 1600 can also encompass many other devices such as televisions (TVs), video projectors, set-top boxes or set-top units, digital video recorders (DVR), computers, netbooks, laptops, tablet computers, and any other audio/visual equipment that can communicate with a network. The electronic device can also keep global positioning coordinates, profile information, or other location information in its stack or memory.

In some embodiments, one or more of the convolution module 804, the HoG estimator module 806, the HoG binning module 808, and/or the HoG descriptor assembly module 1404 can be synthesized using hardware programming languages. The hardware programming languages can include Verilog, VHDL, Bluespec, or any other suitable hardware programming language. In other embodiments, one or more of the convolution module 804, the HoG estimator module 806, the HoG binning module 808, and/or the HoG descriptor assembly module 1404 can be manually designed and can be manually laid-out on a chip.

It will be appreciated that whilst several different arrangements have been described herein, the features of each may be advantageously combined together in a variety of forms to achieve advantage.

In the foregoing specification, the application has been described with reference to specific examples. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An apparatus comprising:
   a memory device;
   a hardware accelerator comprising:
   a programmable convolution module that is configured to compute a gradient vector for at least one pixel in an input image, wherein the gradient vector comprises a first gradient component along a first axis and a second gradient component along a second axis, and
   a histogram of gradient (HoG) estimator module configured to receive the gradient vector and identify one of a plurality of orientation bins in a HoG descriptor associated with the gradient vector using an orientation table stored in the memory device; and
   a HoG binning module configured to add a contribution of the gradient vector to the one of the plurality of orientation bins based on a magnitude of the gradient vector, thereby generating the HoG descriptor.

2. The apparatus of claim 1, wherein the orientation table includes an entry that relates the one of the plurality of orientation bins and a ratio of the first gradient component and the second gradient component.

3. The apparatus of claim 1, wherein the HoG estimator module is configured to receive all gradient vectors in a region of interest in the input image, and provide an orientation bin associated with each of the gradient vectors in the region of interest to the HoG binning module.

4. The apparatus of claim 3, wherein the HoG binning module is configured to generate a HoG descriptor for the region of interest by processing two or more gradient vectors in parallel in accordance with the orientation bin associated with the two or more gradient vectors.

5. The apparatus of claim 1, wherein the HoG binning module is configured to concatenate HoG descriptors associated with two or more regions of interest to generate a block HoG descriptor.

6. The apparatus of claim 5, wherein the HoG binning module is configured to normalize the block HoG descriptor using a normalization constant computed based on a normalization table stored in the memory device.

7. The apparatus of claim 6, wherein the normalization table comprises an entry that indicates a precomputed result of a normalization function for a particular input value.

8. The apparatus of claim 7, wherein the HoG binning module is configured to:
   interpolate two or more precomputed results of the normalization function; and
   compute the normalization constant for the block HoG descriptor based on the interpolation.

9. The apparatus of claim 1, wherein the HoG binning module comprises a software module for operating in a vector processor.

10. The apparatus of claim 9, wherein the vector processor further comprises a recognition module configured to use the block HoG descriptor to perform object recognition.

11. A method comprising:
   computing, using a programmable convolution module of a hardware accelerator in an electronic device, a gradient vector for at least one pixel in an input image, wherein the gradient vector comprises a first gradient component along a first axis and a second gradient component along a second axis;
   identifying, using a histogram of gradient (HoG) estimator module in the hardware accelerator, one of a plurality of orientation bins in a HoG descriptor for the gradient vector using an orientation table stored in a memory device of the electronic device; and
   adding, using a HoG binning module in communication with the HoG estimator module in the electronic device, a contribution of the gradient vector to the one of the plurality of orientation bins based on a magnitude of the gradient vector, thereby generating a HoG descriptor.

12. The method of claim 11, wherein the orientation table includes an entry that relates the one of the plurality of orientation bins and a ratio of the first gradient component and the second gradient component.

13. The method of claim 11, further comprising receiving, at the HoG estimator module, all gradient vectors in a region of interest in the input image, and providing, by the HoG estimator module, an orientation bin associated with each of the gradient vectors in the region of interest to the HoG binning module.

14. The method of claim 13, further comprising generating, at the HoG binning module, a HoG descriptor for the region of interest by processing two or more gradient vectors in parallel.

15. The method of claim 11, further comprising concatenating, at the HoG binning module, HoG descriptors associated with two or more regions of interest to generate a block HoG descriptor.

16. The method of claim 15, further comprising normalizing, at the HoG binning module, the block HoG descriptor using a normalization constant computed based on a normalization table stored in the memory device.

17. The method of claim 16, wherein the normalization table comprises an entry that indicates a precomputed result of a normalization function for a particular input value.

18. The method of claim 17, further comprising:
 interpolating two or more precomputed results of the normalization function; and
 computing the normalization constant for the block HoG descriptor based on the interpolation.

19. The method of claim 11, wherein the HoG binning module resides in a vector processor in communication with the hardware accelerator via the memory device.

20. The method of claim 11, wherein the electronic device comprises a mobile device.

* * * * *